United States Patent
Katakura

(10) Patent No.: US 7,974,017 B2
(45) Date of Patent: Jul. 5, 2011

(54) ZOOM LENS AND IMAGE PICKUP APPARATUS

(75) Inventor: Masahiro Katakura, Chofu (JP)

(73) Assignee: Olympus Imaging Corp., Tokyo (JP)

( * ) Notice: Subject to any disclaimer, the term of this patent is extended or adjusted under 35 U.S.C. 154(b) by 169 days.

(21) Appl. No.: 12/583,451

(22) Filed: Aug. 20, 2009

(65) Prior Publication Data

US 2010/0053767 A1    Mar. 4, 2010

(30) Foreign Application Priority Data

Aug. 27, 2008    (JP) .................. 2008-218531

(51) Int. Cl.
*G02B 9/34* (2006.01)

(52) U.S. Cl. .......................................... 359/781

(58) Field of Classification Search .......... 359/686, 359/740, 781
See application file for complete search history.

(56) References Cited

U.S. PATENT DOCUMENTS

| | | | |
|---|---|---|---|
| 4,281,906 A * | 8/1981 | Tanaka | 359/688 |
| 6,191,896 B1 | 2/2001 | Itoh | |
| 6,233,099 B1 | 5/2001 | Itoh | |

FOREIGN PATENT DOCUMENTS

| | | |
|---|---|---|
| JP | 11-84242 | 3/1999 |
| JP | 2006-208889 | 8/2006 |
| JP | 2008-180901 | 8/2008 |

* cited by examiner

*Primary Examiner* — Joseph Martinez
(74) *Attorney, Agent, or Firm* — Kenyon & Kenyon LLP

(57) ABSTRACT

A zoom lens includes, in order from its object side, a first lens unit having a negative refracting power, a second lens unit having a positive refracting power, a third lens unit having a negative refracting power, and a fourth lens unit having a positive refracting power. The zoom lens further includes an aperture stop disposed between the first lens unit and the third lens unit. During zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end. The second lens unit and the third lens unit satisfy certain conditions.

35 Claims, 14 Drawing Sheets

ZOOM LENS AND IMAGE PICKUP APPARATUS

CROSS-REFERENCE TO RELATED APPLICATION

The present application is based upon and claims the benefit of priority from the prior Japanese Patent Application No. 2008-218531 filed on Aug. 27, 2008; the entire contents of which are incorporated herein by reference.

BACKGROUND OF THE INVENTION

1. Field of the Invention

The present invention relates to a zoom lens. The present invention further relates to an image pickup apparatus, such as a digital camera and video camera, equipped with a zoom lens and an image pickup element.

2. Description of the Related Art

In recent years, digital cameras have replaced film cameras to become the mainstream in the technical field of the image pickup apparatus. Digital cameras have image pickup areas that are generally smaller in size than those of film cameras, and therefore a reduction in the size of digital cameras can be achieved more easily. Nowadays, since there is the trend that a higher importance is placed on the portability as compared to the past, the sizes of digital cameras have been made smaller. Furthermore, since consumers wish to enjoy easy shooting in both indoor and outdoor shooting situations, increases in the angle of view and increases in the zoom ratio of zoom lenses used as the optical systems of digital cameras are needed.

Various zoom lenses have been developed in the past with a view to achieve a smallness in size, a wide angle of view, and a high zoom ratio. For example, Japanese Patent Application Laid-Open Nos. 2006-208889 and 11-84242 disclose negative-front type zoom lenses in which the lens unit located closest to the object side has a negative refracting power. The negative front type zoom lens like this has a retro-focus type overall refracting power arrangement, which is more advantageous in achieving a large angle of view at the wide angle end as compared to the positive-front type zoom lens, and also advantageous in achieving smallness in the overall size of the zoom lens by virtue of a reduction in the size of the lens unit closest to the object side.

The zoom lenses disclosed in Japanese Patent Application Laid-Open Nos. 2006-208889 and 11-84242, mentioned above byway of example, include, in order from the object side thereof, a first lens unit having a negative refracting power, a second lens unit having a positive refracting power, a third lens unit having a negative refracting power, and a fourth lens unit having a positive refracting power, wherein during zooming from the wide angle end to the telephoto end, the second lens unit and the third lens unit are moved toward the object side.

SUMMARY OF THE INVENTION

A zoom lens according to a first aspect of the present invention comprises, in order from its object side:
a first lens unit having a negative refracting power;
a second lens unit having a positive refracting power;
a third lens unit having a negative refracting power; and
a fourth lens unit having a positive refracting power, wherein
the zoom lens comprises an aperture stop disposed between the first lens unit and the third lens unit,
during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, and
the second lens unit and the third lens unit satisfy the following conditional expressions (1) and (2):

$$3.1 < \beta_{2(t)}/\beta_{2(w)} < 6.0 \tag{1}$$

$$1.00 < \beta_{3(t)}/\beta_{3(w)} < 1.25 \tag{2},$$

where $\beta_{2(w)}$ and $\beta_{2(t)}$ are the lateral magnifications of the second lens unit respectively at the wide angle end and at the telephoto end, and $\beta_{3(w)}$ and $\beta_{3(t)}$ are the lateral magnifications of the third lens unit respectively at the wide angle end and at the telephoto end.

A zoom lens according to a second aspect of the present invention comprises, in order from its object side:
a first lens unit having a negative refracting power;
a second lens unit having a positive refracting power;
a third lens unit having a negative refracting power; and
a fourth lens unit having a positive refracting power, wherein
the zoom lens comprises an aperture stop disposed between the first lens unit and the third lens unit,
during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end,
the first lens unit comprises, in order from the object side, a negative lens component and a positive lens component, the total number of lens components in the first lens unit being two,
the second lens unit and the fourth lens unit satisfy the following conditional expressions (1) and (3), and
the negative lens component in the first lens unit includes a negative lens that satisfies the following conditional expression (4):

$$3.1 < \beta_{2(t)}/\beta_{2(w)} < 6.0 \tag{1}$$

$$1.02 < \beta_{4(t)}/\beta_{4(w)} < 3.00 \tag{3}$$

$$1.80 < nd_{11} < 2.5 \tag{4},$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end, and $nd_{11}$ is a refractive index, for the d-line, of a certain negative lens in the negative lens component in the first lens unit.

An image pickup apparatus according to a third aspect of the present invention comprises:
the zoom lens according to the first aspect of the present invention, and an image pickup element disposed on the image side of the zoom lens to convert an image formed by the zoom lens into an electrical signal.

A zoom lens according to another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the second lens unit and the fourth lens unit satisfy the following conditional expressions (1) and (3), and the first lens unit has a negative lens component having a shape that satisfies the following conditional expression (7):

$$3.1 < \beta_{2(t)}/\beta_{2(w)} < 6.0 \quad (1)$$

$$1.02 < \beta_{4(t)}/\beta_{4(w)} < 3.00 \quad (3)$$

$$0.3 < (r_{11a} + r_{11b})/(r_{11a} - r_{11b}) < 1.01 \quad (7)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end, $r_{11a}$ is the paraxial radius of curvature of an object side surface of the negative lens component in the first lens unit, and $r_{11b}$ is the paraxial radius of curvature of an image side surface of the negative lens component in the first lens unit.

A zoom lens according to still another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the first lens unit comprises a negative lens component having an object side surface having a curvature that increases in the positive direction with distance from the optical axis, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

A zoom lens according to still another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the aperture stop moves integrally with the second lens unit during zooming from the telephoto end to the wide angle end, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

A zoom lens according to still another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the third lens unit comprises a negative single lens element, the total number of lens elements in the third lens unit being one, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

A zoom lens according to still another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the second lens unit comprises a cemented lens component comprising, in order from the object side, a positive lens and a negative lens, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

A zoom lens according to still another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the aperture stop is disposed immediately in front and on the object side of the second lens unit, the zoom lens comprises a flare stop disposed between the second lens unit and the third lens unit, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

DETAILED DESCRIPTION OF THE INVENTION

Figure 1A:
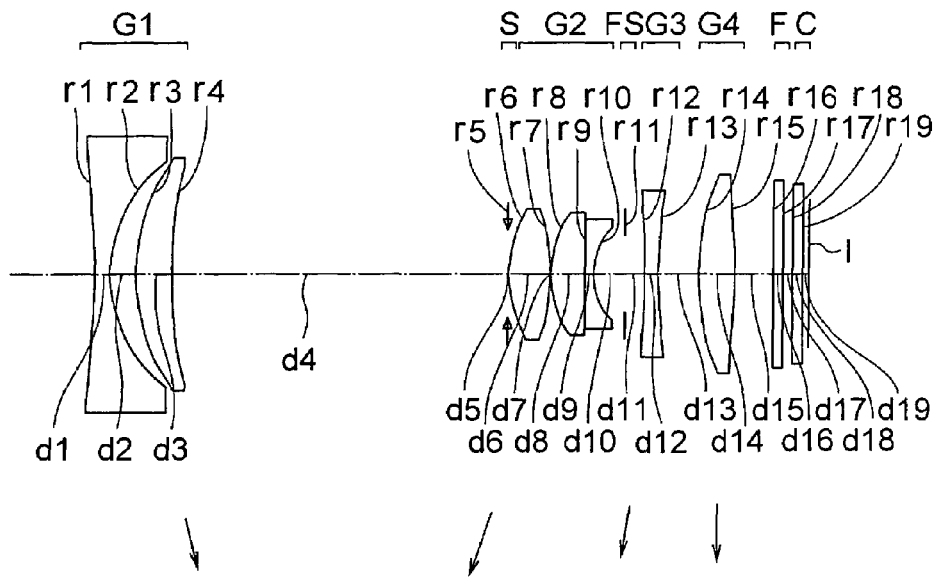
FIGS. 1A, 1B, and 1C are cross sectional views of a zoom lens according to a first embodiment of the present invention taken along its optical axis in the state in which the zoom lens is focused on a object point at infinity respectively at the wide angle end (FIG. 1A), in an intermediate state (FIG. 1B), and at the telephoto end (FIG. 1C)

The zoom lens according to the first aspect of the present invention includes, in order from its object side, a first lens unit having a negative refracting power, a second lens unit having a positive refracting power, a third lens unit having a negative refracting power, and a fourth lens unit having a positive refracting power. The zoom lens further includes an aperture stop disposed between the first lens unit and the third lens unit. During zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end. Furthermore, the second lens unit and the third lens unit satisfy the following conditional expressions (1) and (2):

$$3.1 < \beta_{2(t)}/\beta_{2(w)} < 6.0 \quad (1)$$

$$1.00 < \beta_{3(t)}/\beta_{3(w)} < 1.25 \quad (2),$$

where $\beta_{2(w)}$ and $\beta_{2(t)}$ are the lateral magnifications of the second lens unit respectively at the wide angle end and at the telephoto end, and $\beta_{3(w)}$ and $\beta_{3(t)}$ are the lateral magnifications of the third lens unit respectively at the wide angle end and at the telephoto end.

By this configuration, a lens unit arrangement with a refracting power arrangement that easily ensures a large angle of view is achieved. The magnification increasing effect for zooming from the wide angle end to the telephoto end is shared among the second lens unit and the third lens unit, which is advantageous in achieving an adequate zoom ratio and in controlling the balance among aberrations. Moving the aperture stop in the above-described manner enables a reduction in the size of the second lens unit and facilitates a reduction in variations of aberrations even though the second lens unit has the magnification changing effect.

The position of the image plane is adjusted by the above-described movement of the first lens unit. By providing the third lens unit having a negative refracting power and the fourth lens unit having a positive refracting power and changing the distance between these lens units, a variation in the position of the exit pupil between the wide angle end and the telephoto end can be reduced, and these lens units can be designed to contribute to correction of curvature of field and to have the magnification changing effect.

Conditional expressions (1) and (2) specify preferred changes in the lateral magnifications of the second lens unit and the third lens unit between the wide angle end and the telephoto end. In order to achieve both high zoom ratio and good optical performance in the negative-front type zoom lens, it is preferred that the magnification change ratio of the second lens unit having a positive refracting power and the magnification change ratio the third lens unit having a negative refracting power be selected appropriately. This is because in the zoom lens in which the magnification changing effect is provided by only one lens unit, it is necessary to move the lens unit that provides the magnification change by a very large amount or to make the refracting power of this lens unit large. The former leads to an increase in the entire length of the zoom lens, and the latter leads to generation of on-axis and off-axis aberrations.

If conditional expressions (1) and (2) are satisfied in the zoom lens including the first lens unit having a negative refracting power, the second lens unit having a positive refracting power, the third lens unit having a negative refracting power, and a fourth lens unit having a positive refracting power, the magnification changing effect is shared suitably for achieving a high zoom ratio, and a reduction in the absolute values of the refracting powers of the lens units or a reduction in the amounts of movement of them is facilitated desirably.

If the lower limit of conditional expression (1) is not exceeded, the magnification change provided by the third lens unit can be made smaller, whereby an increase in aberrations and an increase in the number of lenses can be easily suppressed.

If the upper limit of conditional expression (1) is not exceeded, a reduction in variations of aberrations during changes in the magnification of the second lens unit and a reduction in the entire length of the zoom lens are facilitated.

If the lower limit of conditional expression (2) is not exceeded, the third lens unit provides the magnification change, and the magnification change provided by the second lens unit can be made smaller.

If the upper limit of conditional expression (2) is not exceeded, a reduction of aberrations by a reduction in the refracting power of the third lens unit and slimming of the third lens unit are facilitated.

It is more preferred that the following modification (1') or (1") of conditional expression (1) be satisfied.

$$3.5 < \beta_{2(t)}/\beta_{2(w)} < 5.0 \quad (1')$$

$$4.0 < \beta_{2(t)}/\beta_{2(w)} < 4.2 \quad (1'')$$

It is more preferred that the following modification (2') or (2") of conditional expression (2) be satisfied.

$$1.01 < \beta_{3(t)}/\beta_{3(w)} < 1.10 \quad (2')$$

$$1.02 < \beta_{3(t)}/\beta_{3(w)} < 1.05 \quad (2'')$$

Only the upper or lower limit of the basic conditional expression (1), (2) may be replaced by the upper or lower value of a corresponding modified conditional expression. In the case where the zoom lens has the focusing function, the above-described conditions should be regarded as conditions in the state in which the zoom lens is focused on an object at the farthest distance. This is also the case with the conditions that will be described in the following.

The zoom lens according to the second aspect of the present invention includes, in order from its object side, a first lens unit having a negative refracting power, a second lens unit having a positive refracting power, a third lens unit having a negative refracting power, and a fourth lens unit having a positive refracting power. The zoom lens further includes an aperture stop disposed between the first lens unit and the third lens unit. During zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end. Furthermore, the first lens unit comprises, in order form the object side, a negative lens component and a positive lens component, and the total number of lens components in the first lens unit is two. Still further, the second lens unit and the fourth lens unit satisfy the following conditional expressions (1) and (3), and the negative lens component in the first lens unit includes a negative lens that satisfies the following conditional expression (4):

$$3.1 < \beta_{2(t)}/\beta_{2(w)} < 6.0 \quad (1)$$

$$1.02 < \beta_{4(t)}/\beta_{4(w)} < 3.00 \quad (3)$$

$$1.80 < nd_{11} < 2.5 \quad (4)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end, and $nd_{11}$ is the refractive index, for the d-line, of a certain negative lens in the negative lens component in the first lens unit.

By this configuration, a lens unit arrangement with a refracting power arrangement that easily ensures a large angle of view is achieved. The magnification increasing effect for zooming from the wide angle end to the telephoto end is shared among the second lens unit and the fourth lens unit, which is advantageous in achieving an adequate zoom ratio and in controlling the balance among aberrations. Moving the aperture stop in the above-described manner enables a reduction in the size of the second lens unit and facilitates a reduction in variations of aberrations even though the second lens unit has the magnification changing effect.

The position of the image plane is adjusted by the above-described movement of the first lens unit. By providing the third lens unit having a negative refracting power and the fourth lens unit having a positive refracting power and changing the distance between these lens units, a variation in the position of the exit pupil between the wide angle end and the telephoto end can be reduced, and these lens units can be designed to contribute to correction of curvature of field and to have the magnification changing effect.

Conditional expressions (1) and (3) specify preferred changes in the lateral magnifications of the second lens unit and the fourth lens unit between the wide angle end and the telephoto end. In order to achieve both high zoom ratio and good optical performance in the negative-front type zoom lens, it is preferred that the magnification change ratios of the second lens unit having a positive refracting power and the fourth lens unit having a positive refracting power that are moved to increase magnification be selected appropriately. This is because in the zoom lens in which the magnification changing effect is provided by only one lens unit, it is necessary to move the lens unit that provides the magnification change by a very large amount or to make the refracting power of this lens unit large. The former leads to an increase in the entire length of the zoom lens, and the latter leads to generation of on-axis and off-axis aberrations.

If conditional expressions (1) and (3) are satisfied in the zoom lens including the first lens unit having a negative refracting power, the second lens unit having a positive refracting power, the third lens unit having a negative refracting power, and a fourth lens unit having a positive refracting power, the magnification changing effect is shared suitably for achieving a high zoom ratio, and a reduction in the absolute values of the refracting powers of the lens units or a reduction in the amounts of movement of them is facilitated desirably.

If the lower limit of conditional expression (1) is not exceeded, the magnification change provided by the third lens unit can be made smaller, whereby an increase in aberrations and an increase in the number of lenses can be easily suppressed.

If the upper limit of conditional expression (1) is not exceeded, a reduction in variations of aberrations during changes in the magnification of the second lens unit and a reduction in the entire length of the zoom lens are facilitated.

If the lower limit of conditional expression (3) is not exceeded, the fourth lens unit provides the magnification change, and the magnification change provided by the second lens unit can be made smaller. This also facilitates a reduction in spherical aberration at the telephoto end.

If the upper limit of conditional expression (3) is not exceeded, the amount of movement of the fourth lens unit can be made moderately small, and an increase in the entire length of the zoom lens can be made smaller.

It is more preferred that the following modification (1') or (1") of conditional expression (1) be satisfied.

$$3.5 < \beta_{2(t)}/\beta_{2(w)} < 5.0 \quad (1')$$

$$4.0 < \beta_{2(t)}/\beta_{2(w)} < 4.2 \quad (1'')$$

It is more preferred that the following modification (3') or (3") of conditional expression (3) be satisfied.

$$1.05 < \beta_{4(t)}/\beta_{4(w)} < 2.00 \quad (3')$$

$$1.10 < \beta_{4(t)}/\beta_{4(w)} < 1.30 \quad (3'')$$

Only the upper or lower limit value of the basic conditional expression (1), (3) may be replaced by the upper or lower limit value of a corresponding modified conditional expression. In the case where the zoom lens has the focusing function, the above-described conditions should be regarded as conditions in the state in which the zoom lens is focused on an object at the farthest distance. This is also the case with the conditions that will be described in the following.

There may be a zoom lens that has the features of both the zoom lens according to the first aspect and the zoom lens according to the second aspect. In other words, in the zoom lens according to the first aspect, it is preferred that the fourth lens unit move during zooming from the wide angle end to the telephoto end in such a way as to be located closer to the image side at the telephoto end than at the wide angle end, and the fourth lens unit satisfy the following conditional expression (3):

$$1.02 < \beta_{4(t)}/\beta_{4(w)} < 3.00 \quad (3),$$

where $\beta_{4(w)}$ and $\beta_{4(t)}$ are the lateral magnifications of the fourth lens unit respectively at the wide angle end and at the telephoto end.

Conditional expression (3) relates to the change in the lateral magnification of the fourth lens unit. In order to achieve both high zoom ratio and good optical performance, it is preferred that the fourth lens unit provide the magnification increasing effect, in addition to the magnification changing effect provided by the second lens unit and the third lens unit. If the lower limit of conditional expression (3) is not exceeded, the refracting powers of the second lens unit and the third lens unit can be made small, which enables good correction of spherical aberration in particular. If the upper limit of conditional expression (3) is not exceeded, the movement amount of the fourth lens unit can be made moderately small, and an increase in the entire length of the zoom lens can be made smaller.

It is more preferred that the following modification (3') or (3") of conditional expression (3) be satisfied.

$$1.05 < \beta_{3(t)}/\beta_{3(w)} < 2.00 \quad (3')$$

$$1.10 < \beta_{3(t)}/\beta_{3(w)} < 1.30 \quad (3'')$$

In the zoom lens according to the first aspect and the zoom lens according to the second aspect, it is preferred that one of the following features be adopted.

It is preferred that the third lens unit and the fourth lens unit move during zooming from the wide angle end to the telephoto end. Moving the third lens unit and the fourth lens unit during zooming facilitates sharing of the magnification change and a reduction in variations of aberrations.

It is also preferred that the first lens unit be composed of two lens component including, in order from the object side, a negative lens component and a positive lens component. By this feature, a principal point of the first lens unit can be made closer to the object side, which enables a reduction in the diameter of the first lens unit. In addition, this feature facilitates correction of off-axis aberrations at the wide angle end and spherical aberration at the telephoto end.

In the context of this specification, a lens component refers to a lens member whose surfaces that are in contact with air on the optical axis include only two surfaces, one being the object side surface and the other being the image side surface.

It is also preferred that at least one surface of the negative lens component be an aspheric surface. This enables good correction of off-axis aberrations at the wide angle end while providing the negative lens component with an appropriate negative refracting power. Furthermore, this feature is advantageous in achieving compactness by a reduction in the entire length of the zoom lens, since the first lens unit, as a whole, can have an adequate negative refracting power.

It is preferred that both the object side surface and the image side surface of the negative lens component be aspheric surfaces in order to reduce aberrations in the case where the angle of view is increased. It is preferred that the object side aspheric surface have a shape having a curvature that changes in the positive direction with distance from the optical axis. This shape facilitates control of balance between spherical aberration and off-axis aberrations. It is preferred that the image side aspheric surface have a shape having a positive curvature that decreases with distance from the optical axis. This shape facilitates correction of off-axis aberrations that may be caused with an increase in the angle of view. It is also preferred that each of the lens components be a single lens element.

It is also preferred that the zoom lens be a four-unit zoom lens composed of the first lens unit, the second lens unit, the third lens unit, and the fourth lens unit arranged in order from the object side. If the zoom lens is composed, in order from the object side, of the first lens unit having a negative refracting power, the second lens unit having a positive refracting power, the third lens unit having a negative refracting power, and the fourth lens unit having a positive refracting power, the number of lens units can be made small. This is advantageous in slimming the zoom lens in the state in which the lens barrel is collapsed. Furthermore, having the same number of lens units having a negative refracting power and lens units having a positive refracting power facilitates balancing of the Petzval sum.

It is preferred that the negative lens component in the first lens unit include a negative lens that satisfies the following conditional expression (4):

$$1.80 < nd_{11} < 2.5 \tag{4}$$

where $nd_{11}$ is the refractive index, for the d-line, of a certain negative lens in the negative lens component in the first lens unit.

Conditional expression (4) specifies preferred values of the refractive index, for the d-line, of a negative lens included in the negative lens component in the first lens unit. If the lower limit of conditional expression (4) is not exceeded, the negative lens component can have an adequate refracting power with a small paraxial curvature. This is advantageous in achieving a high zoom ratio and in reducing aberrations. In particular, curvature of field at the wide angle end and spherical aberration at the telephoto end can be suppressed. If the upper limit of conditional expression (4) is not exceeded, materials hard to machine, such as diamond, need not be used, and therefore the cost can be made lower.

It is more preferred that the following modification (4') or (4") of conditional expression (4) be satisfied.

$$1.83 < nd_{11} < 2.0 \tag{4'}$$

$$1.85 < nd_{11} < 1.9 \tag{4"}$$

It is also preferred that the positive lens component in the first lens unit include a positive lens that satisfies the following conditional expression (5):

$$1.80 < nd_{12} < 2.5 \tag{5}$$

where $nd_{12}$ is the refractive index, for the d-line, of a certain positive lens in the positive lens component in the first lens unit.

Conditional expression (5) specifies preferred values of the refractive index, for the d-line, of a positive lens included in the positive lens component in the first lens unit. If the lower limit of conditional expression (5) is not exceeded, the positive lens component can have an adequate refracting power with a small paraxial curvature. This is advantageous in reducing aberrations. In particular, curvature of field at the wide angle end and spherical aberration at the telephoto end can be suppressed. If the upper limit of conditional expression (5) is not exceeded, materials hard to machine, such as diamond, need not be used, and therefore the cost can be made lower.

It is more preferred that the following modification (5') or (5") of conditional expression (5) be satisfied.

$$1.85 < nd_{12} < 2.3 \tag{5'}$$

$$1.90 < nd_{12} < 2.1 \tag{5"}$$

It is preferred that the first lens unit include a negative lens component having a shape that satisfies the following conditional expression (7):

$$0.3 < (r_{11a} + r_{11b})/(r_{11a} - r_{11b}) < 1.01 \tag{7}$$

where $r_{11a}$ is the paraxial radius of curvature of the object side surface of the negative lens component in the first lens unit, and $r_{11b}$ is the paraxial radius of curvature of the image side surface of the negative lens component in the first lens unit.

Conditional expression (7) specifies a preferred condition concerning the shape of the negative lens component in the first lens unit. If the lower limit of conditional expression (7) is not exceeded, the negative refracting power of the object side surface of the negative lens component is prevented from becoming unduly large, which facilitates a reduction in off-axis aberrations at the wide angle end. If the paraxial curvature of the image side surface of the negative lens component is made small so that the upper limit of conditional expression (7) is not exceeded, a reduction in spherical aberration at the telephoto end is facilitated.

It is more preferred that the following modification (7') or (7") of conditional expression (7) be satisfied.

$$0.4 < (r_{11a} + r_{11b})/(r_{11a} - r_{11b}) < 0.9 \tag{7'}$$

$$0.5 < (r_{11a} + r_{11b})/(r_{11a} - r_{11b}) < 0.8 \tag{7"}$$

It is preferred that the object side surface of the negative lens component in the first lens unit have a curvature that increases in the positive direction with distance from the optical axis. To correct spherical aberration, it is advantageous for the object side surface of the negative lens component to have a weak positive or negative curvature in the region in the vicinity of the optical axis, and the angle of incidence of rays is decreased by the above-described aspheric surface design, which provides a further advantage in reducing spherical aberration at the telephoto end and off-axis aberration at the wide angle end, It is preferred that the third lens unit be composed of one negative lens component. In the zoom lenses according to the first aspect and the second aspect, the negative refracting power of the third lens unit may be designed to be small. Thus, composing the third lens unit of one negative lens component provides a further advantage for slimming of the zoom lens in the state in which the lens barrel is collapsed.

It is preferred that the negative lens component in the third lens unit have a shape that satisfies the following conditional expression (8):

$$-5.0 < (r_{31a} + r_{31b})/(r_{31a} - r_{31b}) < 3.0 \qquad (8)$$

where $r_{31a}$ is the paraxial radius of curvature of the object side surface of the negative lens component in the third lens unit, and $r_{31b}$ is the paraxial radius of curvature of the image side surface of the negative lens component in the third lens unit.

Conditional expression (8) specifies preferred shapes for the negative lens component in the third lens unit. If the lower limit of conditional expression (8) is not exceeded, suppression of inward coma (or negative coma) caused by the image side surface of the negative lens component is facilitated. If the upper limit of conditional expression (8) is not exceeded, suppression of outward coma (or positive coma) caused by the image side surface of the negative lens component is facilitated.

It is more preferred that the following modification (8') or (8") of conditional expression (8) be satisfied.

$$-3.0 < (r_{31a} + r_{31b})/(r_{31a} - r_{31b}) < 1.5 \qquad (8')$$

$$-2.5 < (r_{31a} + r_{31b})/(r_{31a} - r_{31b}) < 0.5 \qquad (8'')$$

It is also preferred that each of the first lens unit, the second lens unit, the third lens unit, and the fourth lens unit include an aspheric lens. This is advantageous in reducing aberrations generated by each lens unit, in reducing the number of lenses in each lens unit, and in reducing the size of the zoom lens in the state in which the lens barrel is collapsed.

It is preferred that the zoom lens satisfy the following conditional expression (9):

$$3.5 < f_t/f_w < 10 \qquad (9)$$

where $f_t$ is the focal length of the entire zoom lens system at the telephoto end, and $f_w$ is the focal length of the entire zoom lens system at the wide angle end.

Conditional expression (9) relates to the zoom ratio. If the lower limit of conditional expression (9) is not exceeded, a sufficient degree of freedom in changing the angle of view is ensured, and accordingly the zoom lens can be suitably used in various shooting situations. If the upper limit of conditional expression (9) is not exceeded, aberrations generated by the first and second lens units can easily be made small. This is advantageous in achieving size reduction and good performance throughout the entire zoom range.

It is more preferred that the following modification (9'), (9"), or (9''') of conditional expression (9) be satisfied.

$$3.7 < f_t/f_w < 8 \qquad (9')$$

$$4.0 < f_t/f_w < 6 \qquad (9'')$$

$$4.5 < f_t/f_w < 5.2 \qquad (9''')$$

It is preferred that the fourth lens unit be composed of one positive lens component. Since the fourth lens unit is located close to the image plane, it does not affect spherical aberration greatly. In view of this, the fourth lens unit may be composed of one positive lens component, whereby slimming of the zoom lens in the state in which the lens barrel is collapsed is facilitated.

It is preferred that the object side surface of the positive lens component in the fourth lens unit be an aspheric surface having a curvature that increases in the positive direction with distance from the optical axis, and the positive lens component in the fourth lens unit have a shape that satisfies the following conditional expression (10):

$$-0.7 < (r_{41a} + r_{41b})/(r_{41a} - r_{41b}) < 3.0 \qquad (10)$$

where $r_{41a}$ is the paraxial radius of curvature of the object side surface of the positive lens component in the fourth lens unit, and $r_{41b}$ is the paraxial radius of curvature of the image side surface of the positive lens component in the fourth lens unit.

The above-described shape design of the object side surface of the positive lens component in the fourth lens unit is advantageous in achieving a telecentricity at zoom positions near the telephoto end. Conditional expression (10) specifies preferred shapes for the positive lens component in the fourth lens unit. If the lower limit of conditional expression (10) is not exceeded, the paraxial curvature of the object side surface thereof can be made small, and the aspheric surface shape design is facilitated. If the upper limit of conditional expression (10) is not exceeded, off-axis aberrations generated by the image side surface of the positive lens component can easily be made small.

It is more preferred that the following modification (10') or (10") of conditional expression (10) be satisfied.

$$-0.3 < (r_{41a} + r_{41b})/(r_{41a} - r_{41b}) < 1.0 \qquad (10')$$

$$0.0 < (r_{41a} + r_{41b})/(r_{41a} - r_{41b}) < 0.6 \qquad (10'')$$

It is preferred that the aperture stop be disposed immediately in front and on the object side of the second lens unit and move integrally with the second lens unit during zooming from the wide angle end to the telephoto end.

The above feature enables a reduction in the effective diameters of the first lens unit and the second lens unit and provides advantages in reducing the diameter of the zoom lens and in achieving an adequate magnification change by the second lens unit.

It is preferred that the third lens unit or the fourth lens unit move during focusing. If the third lens unit or the fourth lens unit serves as a focusing lens unit, load on the drive mechanism can easily be decreased, because the absolute values of the refracting powers of the third lens unit and the fourth lens unit can easily be made small.

It is preferred that the second lens unit and the fourth lens unit satisfy the following conditional expression (13):

$$0.65 < P_4/P_2 < 1.0 \qquad (13)$$

where $P_2$ is the refracting power of the second lens unit, and $P_4$ is the refracting power of the fourth lens unit.

Conditional expression (13) specifies preferred values of the ratio of positive refracting powers allotted to the second lens unit and the fourth lens unit. If the fourth lens unit has an adequately large positive refracting power so that the lower limit of conditional expression (13) is not exceeded, the refracting power of the second lens unit can be made relatively small. This facilitates suppression of on-axis aberrations. If the second lens unit has an adequately large positive refracting power so that the upper limit of conditional expression (13) is not exceeded, the refracting power of the fourth lens unit can be made relatively small. This facilitates suppression of off-axis aberrations.

It is more preferred that the following modification (13') or (13") of conditional expression (13) be satisfied.

$$0.75 < P_4/P_2 < 0.95 \quad (13')$$

$$0.85 < P_4/P_2 < 0.9 \quad (13'')$$

It is preferred that the first lens unit and the third lens unit satisfy the following conditional expression (14):

$$0.1 < P_3/P_1 < 0.7 \quad (14),$$

where $P_3$ is the refracting power of the third lens unit, and $P_1$ is the refracting power of the first lens unit.

Conditional expression (14) specifies preferred values of the ratio of negative refracting powers of the first lens unit and the third lens unit. If the third lens unit has an adequately large negative refracting power so that the lower limit of conditional expression (14) is not exceeded, the third lens unit can readily provide the magnification increasing effect and the aberration adjusting function. If the negative refracting power of the third lens unit is made appropriately small so that the upper limit of conditional expression (14) is not exceeded, size reduction is facilitated by virtue of a reduction in aberrations generated by the third unit.

It is more preferred that the following modification (14') or (14") of conditional expression (14) be satisfied.

$$0.12 < P_3/P_1 < 0.6 \quad (14')$$

$$0.15 < P_3/P_1 < 0.5 \quad (14'')$$

It is preferred that anti-reflection coating be applied on at least one lens surface among the lens surfaces of the lenses that constitute the zoom lens. This is advantageous in improving the quality of images formed by the zoom lens.

An image pickup apparatus according to the present invention comprises any one of the zoom lenses described in the foregoing and an image pickup element disposed on the image side of the zoom lens to convert an image formed by the zoom lens into an electrical signal. Thus, an image pickup apparatus that is advantageous for size reduction and increasing the zoom ratio can be provided.

It is preferred in the image pickup apparatus according to the present invention that the fourth lens unit be composed of one positive lens component, the object side surface and the image side surface of the positive lens component be aspheric surfaces each having a curvature that increases in the positive direction with distance from the optical axis, and the object side surface and the image side surface of the positive lens component have shapes that satisfy the following conditional expression (11)

$$0.5 < \Delta ASP_{41b}/\Delta ASP_{41a} < 10.0 \quad (11)$$

where $\Delta ASP_{41a}$ is the aspheric offset of the object side surface of the positive lens component in the fourth lens unit at a position away from the optical axis by the maximum image height, and $\Delta ASP_{41b}$ is the aspheric offset of the image side surface of the positive lens component in the fourth lens unit at a position away from the optical axis by the maximum image height, wherein the aspheric offset is defined as the distance, along the optical axis, from a reference sphere that has a vertex located at the vertex of the aspheric surface and a radius of curvature equal to the paraxial radius of curvature of the aspheric surface to the aspheric surface, the aspheric offset is represented by a positive value when the aspheric surface is on the image side of the reference sphere, and in the case where the maximum image height changes, the maximum image height refers to the largest possible value thereof.

Figure 14:
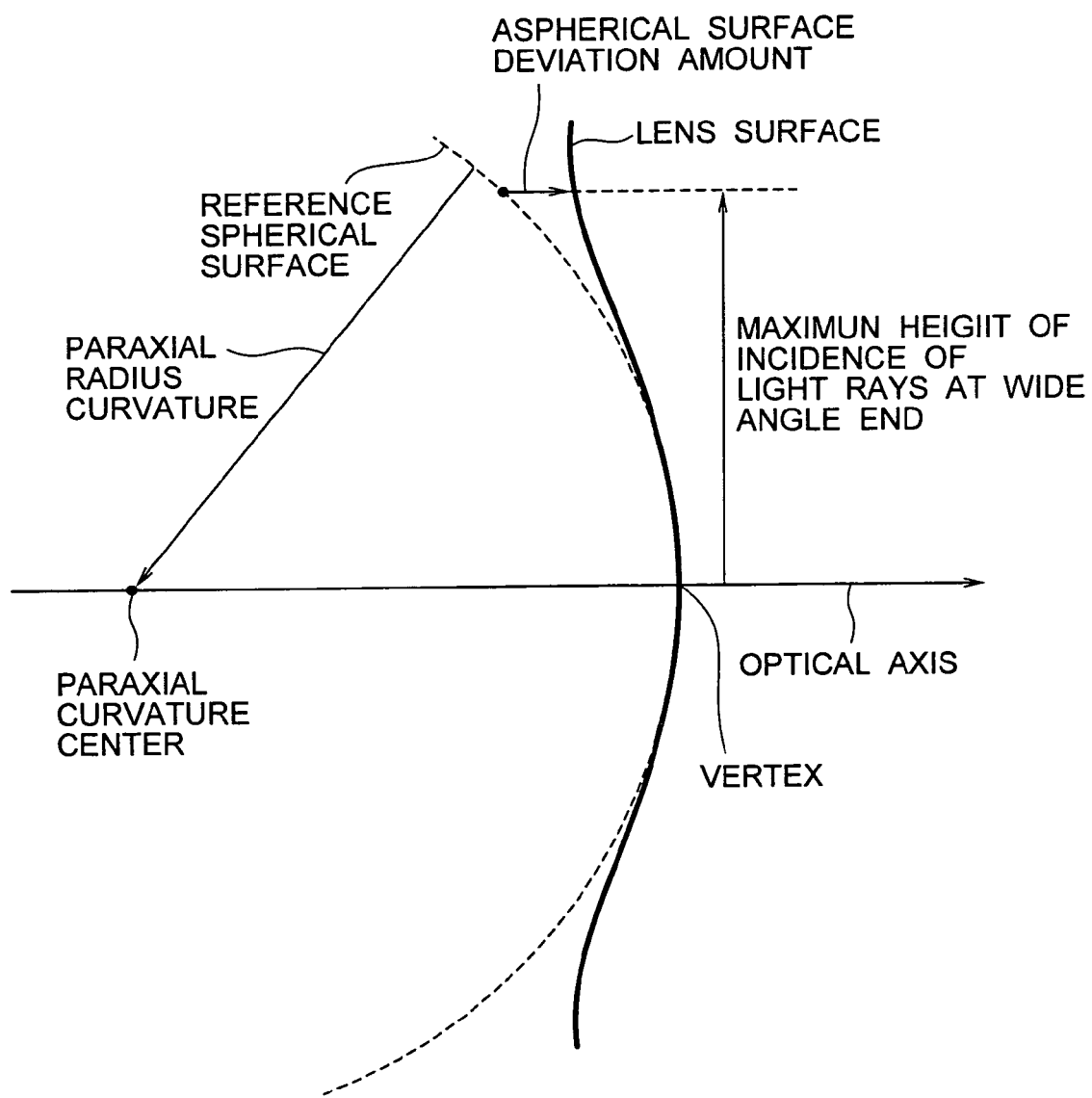
FIG. 14 is a cross sectional view illustrating an aspheric offset of an aspheric lens used in a zoom lens according to the present invention.

Here, as shown in FIG. 14, the aspheric offset refers to the distance, along the optical axis, from the reference sphere that has a vertex located at the vertex of the aspheric surface and a radius of curvature equal to the paraxial radius of curvature of the aspheric surface to the aspheric surface, and the aspheric offset is represented by a positive value when the aspheric surface is on the image side of the reference sphere. FIG. 14 is a cross sectional view illustrating the aspheric offset of an aspheric lens according to the present invention.

The above described design of the aspheric object side surface of the positive lens component in the fourth lens unit is advantageous in achieving telecentricity at the telephoto end. The above described design of the aspheric image side surface of this positive lens component is advantageous in reducing off-axis aberrations.

Conditional expression (11) relates to good balance between the aspheric offset of the object side surface of the positive lens component and the aspheric offset of the image side surface of the same lens component. Designing this positive lens component in such a way that the lower limit of conditional expression (11) is not exceeded is advantageous in achieving appropriate correction of off-axis aberrations by the aspheric image side surface, or alternatively, in reducing off-axis aberrations by preventing the aspheric offset of the object side surface thereof from becoming unduly large. Designing the positive lens component in such a way that the upper limit of conditional expression (11) is not exceeded is advantageous in reducing the influence of decentering (if present) of the fourth lens unit on the image plane by preventing the aspheric offset of the image side surface thereof from becoming unduly large, or alternatively, in achieving telecentricity by the aspheric object side surface.

It is more preferred that the following modification (11') or (11") of conditional expression (11) be satisfied.

$$1.0 < \Delta ASP_{41b}/\Delta ASP_{41a} < 5.0 \quad (11')$$

$$1.3 < \Delta ASP_{41b}/\Delta ASP_{41a} < 3.0 \quad (11'')$$

It is preferred in the image pickup apparatus according to the present invention that the zoom lens satisfy the following conditional expression (6):

$$0.5 < enp_{(w)}/IH_{(max)} < 3.0 \quad (6),$$

where $enp_{(w)}$ is the entrance pupil position of the zoom lens at the wide angle end represented by the on-axis distance from the vertex of the object side surface of the lens closest to the object side to the entrance pupil, wherein the entrance pupil position on the image side of the vertex is represented by a positive value, and $IH_{(max)}$ is the maximum image height, wherein in the case where the maximum image height changes, the maximum image height refers to the largest possible value thereof.

Designing the zoom lens in such a way that the entrance pupil position falls within the range limited by conditional expression (6) is advantageous in reducing the size of, in particular, the first lens unit with respect to the diametrical direction and in achieving a wide angle view and a high zoom ratio.

It is more preferred that the following modification (6') or (6") of conditional expression (6) be satisfied.

$$1.0 < enp_{(w)}/IH_{(max)} < 2.5 \quad (6')$$

$$1.8 < enp_{(w)}/IH_{(max)} < 2.2 \quad (6'')$$

It is preferred in the image pickup apparatus according to the present invention that the third lens unit move in such a way as to satisfy the following conditional expression (12):

$$-4.0 < D_{g3}/IH_{(max)} < 0.1 \quad (12)$$

where $D_{g3}$ is the displacement of the position of the third lens unit at the telephoto end from the position thereof at the wide angle end, wherein the displacement toward the image side is represented by a positive value, and $IH_{(max)}$ is the maximum image height, wherein in the case where the maximum image height changes, the maximum image height refers to the largest possible value thereof.

Conditional expression (12) specifies preferred values of the displacement of the third lens unit. If conditional expression (13) is satisfied, the third lens unit can provide the magnification changing effect excellently. If the lower limit of conditional expression (12) is not exceeded, load on the driving mechanism can be made small, which is advantageous in reducing the size of the zoom lens in the state in which the lens barrel is collapsed. If the upper limit is not exceeded, the magnification increasing effect of the third lens unit is facilitated.

It is more preferred that the following modification (12') or (12") of conditional expression (12) be satisfied.

$$-3.0 < D_{g3}/IH_{(max)} < 0.0 \quad (12')$$

$$-1.2 < D_{g3}/IH_{(max)} < -0.5 \quad (12'')$$

It is preferred that the image pickup apparatus according to the present invention be provided with an image transformation section that transforms, by image processing, an electrical signal representing an image containing distortion attributed to the zoom lens into an image signal representing an image in which distortion is corrected. By this feature, images can be recorded or displayed after they have been electrically corrected in terms of distortion attributed to the zoom lens. Therefore, the zoom lens is allowed to have distortion. This is advantageous in achieving correction of curvature of field and coma. In consequence, good image quality can easily be achieved by a small-size zoom lens.

It is preferred that the image pickup apparatus according to the present invention be provided with an image transformation section that transforms, by image processing, an electrical signal representing an image containing chromatic aberration of magnification attributed to the zoom lens into an image signal representing an image in which chromatic aberration of magnification is corrected. Thus, it is preferred that an electrical signal representing an image formed by the zoom lens be transformed by image processing into an image signal representing an image in which color misregistration attributed to chromatic aberration of magnification is corrected. By electrically correcting chromatic aberration of magnification attributed to the zoom lens, images having better image quality can be obtained. Furthermore, since the zoom lens is allowed to have chromatic aberration of magnification, a sufficient degree of freedom in selecting the lens material can be ensured. This is advantageous in reducing the cost, in slimming the zoom lens, and in achieving good performance.

A zoom lens according to another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the second lens unit and the fourth lens unit satisfy the following conditional expressions (1) and (3), and the first lens unit comprises a negative lens component having a shape that satisfies the following conditional expression (7):

$$3.1 < \beta_{2(t)}/\beta_{2(w)} < 6.0 \quad (1)$$

$$1.02 < \beta_{4(t)}/\beta_{4(w)} < 3.00 \quad (3)$$

$$0.3 < (r_{11a} + r_{11b})/(r_{11a} - r_{11b}) < 1.01 \quad (7)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end, $r_{11a}$ is the paraxial radius of curvature of the object side surface of the negative lens component in the first lens unit, and $r_{11b}$ is the paraxial radius of curvature of the image side surface of the negative lens component in the first lens unit.

A zoom lens according to another aspect of the present invention comprises, in order from its object side:

a first lens unit having a negative refracting power;
a second lens unit having a positive refracting power;
a third lens unit having a negative refracting power; and
a fourth lens unit having a positive refracting power, wherein the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the first lens unit comprises a negative lens component having an object side surface having a curvature that increases in the positive direction with distance from the optical axis, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

A zoom lens according to another aspect of the present invention comprises, in order from its object side:
 a first lens unit having a negative refracting power;
 a second lens unit having a positive refracting power;
 a third lens unit having a negative refracting power; and
 a fourth lens unit having a positive refracting power, wherein
 the zoom lens comprises an aperture stop disposed between the first lens unit and the third lens unit,
 during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end,
 the aperture stop moves integrally with the second lens unit during zooming from the telephoto end to the wide angle end, and
 the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

A zoom lens according to another aspect of the present invention comprises, in order from its object side:
 a first lens unit having a negative refracting power;
 a second lens unit having a positive refracting power;
 a third lens unit having a negative refracting power; and
 a fourth lens unit having a positive refracting power, wherein
 the zoom lens comprises an aperture stop disposed between the first lens unit and the third lens unit,
 during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end,
 the third lens unit comprises a negative single lens element, the total number of lens elements in the third lens unit being one, and
 the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

A zoom lens according to another aspect of the present invention comprises, in order from its object side:
 a first lens unit having a negative refracting power;
 a second lens unit having a positive refracting power;
 a third lens unit having a negative refracting power; and
 a fourth lens unit having a positive refracting power, wherein
 the zoom lens comprises an aperture stop disposed between the first lens unit and the third lens unit,
 during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end,
 the second lens unit comprises a cemented lens component comprising, in order from the object side, a positive lens and a negative lens, and
 the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

In the zoom lens according to the present invention, it is preferred that each of the positive lens and the negative lens in the cemented lens component be a meniscus lens having a convex surface directed toward the object side.

In the zoom lens according to the present invention, it is preferred that the positive lens in the cemented lens component be a biconvex positive lens, and the negative lens in the cemented lens component be a biconcave negative lens.

A zoom lens according to another aspect of the present invention comprises, in order from its object side:
 a first lens unit having a negative refracting power;
 a second lens unit having a positive refracting power;
 a third lens unit having a negative refracting power; and
 a fourth lens unit having a positive refracting power, wherein
 the zoom lens comprises an aperture stop disposed between the first lens unit and the third lens unit, during zooming from the wide angle end to the telephoto end, the distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, the distance between the second lens unit and the third lens unit is larger at the telephoto end than at the wide angle end, and the aperture stop moves in such a way as to be located closer to the object side at the telephoto end than at the wide angle end, the aperture stop is disposed immediately in front and on the object side of the second lens unit, the zoom lens comprises a flare stop disposed between the second lens unit and the third lens unit, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are the lateral magnifications of the second lens unit respectively at the wide angle end and at the telephoto end, $\beta_{4(w)}$ and $\beta_{4(t)}$ are the lateral magnifications of the fourth lens unit respectively at the wide angle end and at the telephoto end.

It is more preferred that two or more of the above-described conditions and features, which may be selected arbitrarily, be adopted at the same time. For each of the conditional expressions, only the upper limit value or the lower limit value of the more limited numerical range defined by a corresponding modified conditional expression may be applied. Furthermore, the various features described above may be adopted in any possible combination.

According to the present invention, there can be provided a negative-front type zoom lens which is advantageous in achieving an adequate angle of view at the wide angle end, in reducing the size, and also advantageous in achieving an appropriate zoom ratio and good optical performance.

Furthermore, there can be provided an image pickup apparatus equipped with such a zoom lens.

In the following, embodiments of the zoom lens and the image pickup apparatus according to the present invention will be described in detail with reference to the drawings. It should be understood, however, that the present invention is not limited by the embodiments.

In the following, first to fourth embodiments of the zoom lens according to the present invention will be described. FIGS. 1A, 1B and 1C to 4A, 4B and 4C are cross sectional views of the zoom lenses according to the first to the fourth embodiments respectively at the wide angle end (FIGS. 1A, 2A, 3A, and 4A), in an intermediate focal length state (FIGS. 1B, 2B, 3B, and 4B), and at the telephoto end (FIGS. 1C, 2C, 3C, and 4C) in the state in which the zoom lenses are focused on an object point at infinity. In FIGS. 1A through 4C, a first lens unit is denoted by G1, a second lens unit is denoted by G2, an aperture stop is denoted by S, a third lens unit is denoted by G3, a fourth lens unit is denoted by G4, a plane parallel plate having wavelength range restriction coating applied thereon that blocks or reduces infrared light, constituting a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have the function of a low pass filter.

In all the embodiments, the aperture stop S moves integrally with the third lens unit G3. All the numerical data presented below are for the state in which the zoom lens is focused on an object at infinity. In the numerical data, dimensions are in mm (millimeters) and angles are in degrees. In all the embodiments, focusing is performed by moving the third lens unit G3 or the fourth lens unit G4. Zoom data will be presented for the wide angle end (WE), the intermediate focal length state (ST) defined in connection with the present invention, and the telephoto end (TE).

Figure 1B:
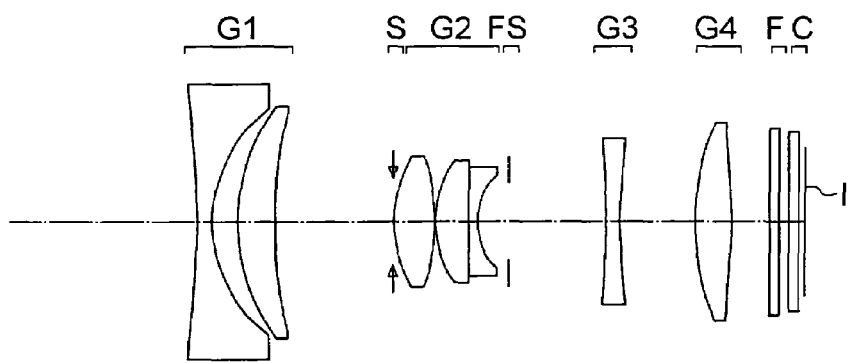
Figure 1C:
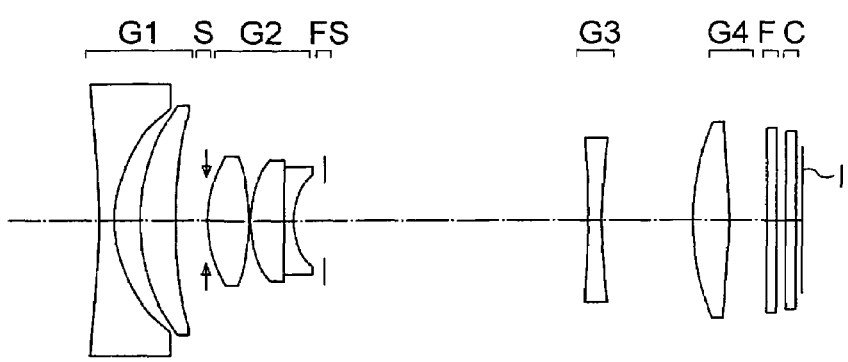

As shown in FIGS. 1A, 1B, and 1C, the zoom lens according to the first embodiment includes, in order from the object side thereof, a first lens unit G1 having a negative refracting power, an aperture stop S, a second lens unit G2 having a positive refracting power, a flare stop FS, a third lens unit G3 having a negative refracting power, and a fourth lens unit G4 having a positive refracting power.

During zooming from the wide angle end to the telephoto end, the first lens unit G1 moves first toward the image side and thereafter toward the object side, the second lens unit G2 moves toward the object side, the third lens unit G3 moves toward the object side, and the fourth lens unit G4 moves toward the image side.

The first lens unit G1 is composed of a biconcave negative lens and a positive meniscus lens having a convex surface directed toward the object side. The second lens unit G2 is composed of a biconvex positive lens, and a cemented lens made up of a positive meniscus lens having a convex surface directed toward the object side and a negative meniscus lens having a convex surface directed toward the object side. The third lens unit G3 is composed of a biconcave negative lens. The fourth lens unit G4 is composed of a biconvex positive lens. All the lens elements in each lens unit G1, G2, G3, G4 are arranged in the mentioned order from the object side.

The following seven lens surfaces are aspheric surfaces: both surfaces of the biconcave negative lens in the first lens unit G1, both surfaces of the biconvex positive lens in the second lens unit G2, the image side surface of the biconcave negative lens in the third lens unit G3, and both surfaces of the biconvex positive lens in the fourth lens unit G4.

Figure 2A:
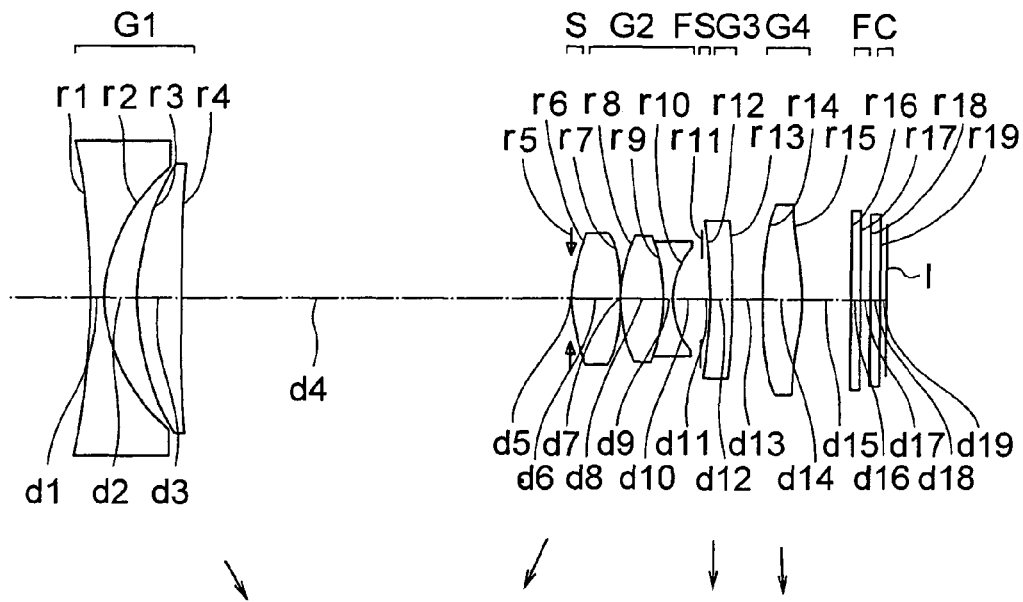
FIGS. 2A, 2B, and 2C are cross sectional views similar to FIGS. 1A, 1B, and 1C, showing a zoom lens according to a second embodiment of the present invention.
Figure 2B:
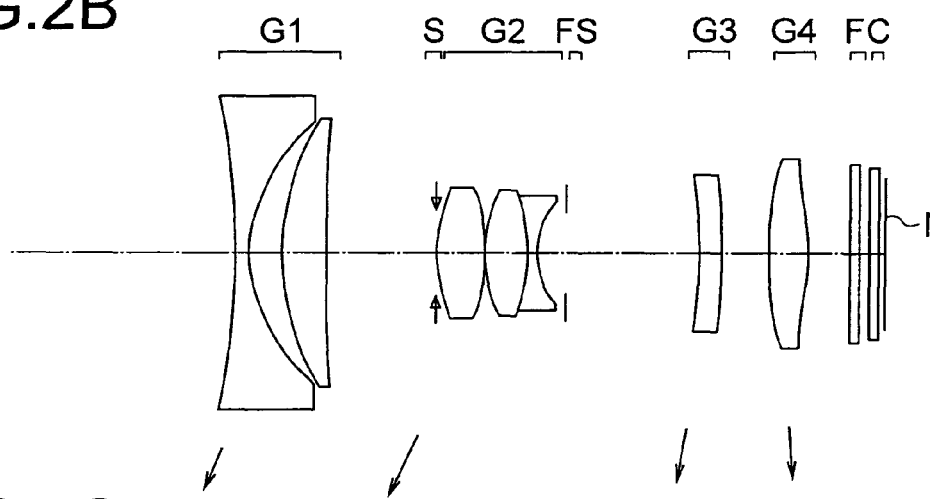
Figure 2C:
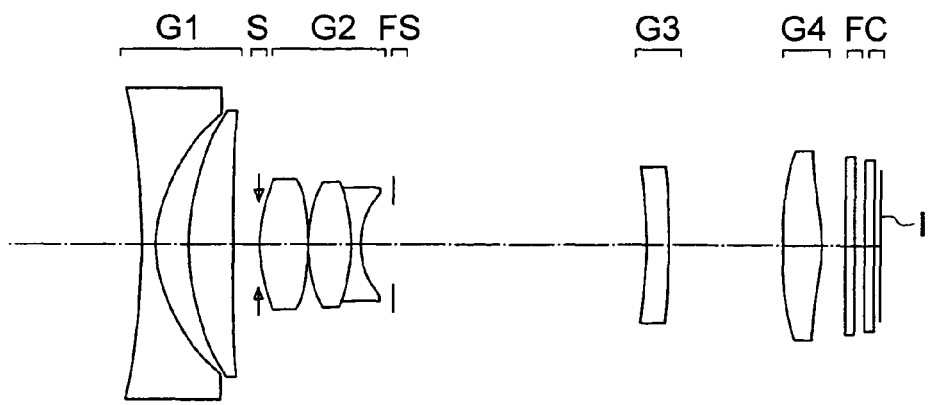

As shown in FIGS. 2A, 2B, and 2C, the zoom lens according to the first embodiment includes, in order from the object side thereof, a first lens unit G1 having a negative refracting power, an aperture stop S, a second lens unit G2 having a positive refracting power, a flare stop FS, a third lens unit G3 having a negative refracting power, and a fourth lens unit G4 having a positive refracting power.

During zooming from the wide angle end to the telephoto end, the first lens unit G1 moves first toward the image side and thereafter toward the object side, the second lens unit G2 moves toward the object side, the third lens unit G3 moves toward the object side, and the fourth lens unit G4 moves toward the image side.

The first lens unit G1 is composed of a biconcave negative lens and a positive meniscus lens having a convex surface directed toward the object side. The second lens unit G2 is composed of a biconvex positive lens, and a cemented lens made up of a biconvex positive lens and a biconcave negative lens. The third lens unit G3 is composed of a negative meniscus lens having a convex surface directed toward the image side. The fourth lens unit G4 is composed of a biconvex positive lens. All the lens elements in each lens unit G1, G2, G3, G4 are arranged in the mentioned order from the object side.

The following seven lens surfaces are aspheric surfaces: both surfaces of the biconcave negative lens in the first lens unit G1, both surfaces of the biconvex positive lens located closest to the object side in the second lens unit G2, the image side surface of the negative meniscus lens in the third lens unit G3, and both surfaces of the biconvex positive lens in the fourth lens unit G4.

Figure 3A:
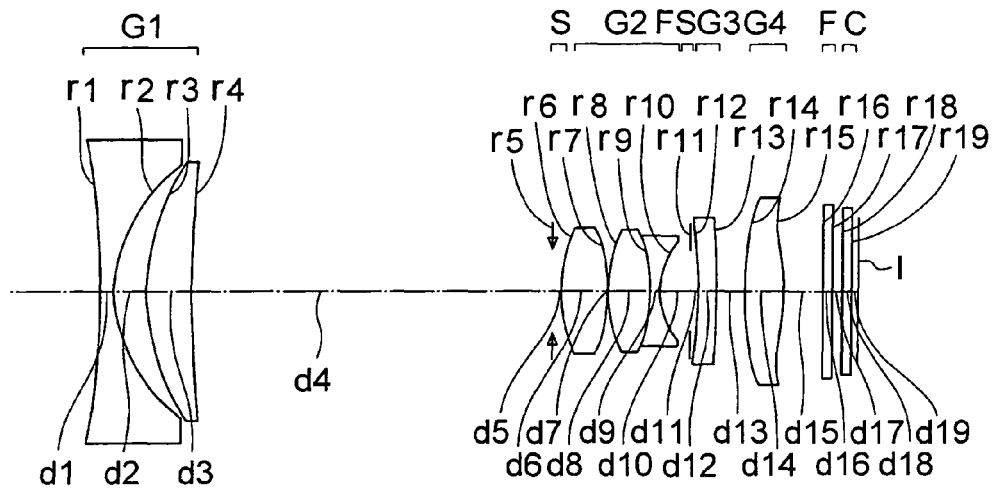
FIGS. 3A, 3B, and 3C are cross sectional views similar to FIGS. 1A, 1B, and 1C, showing a zoom lens according to a third embodiment of the present invention.
Figure 3B:
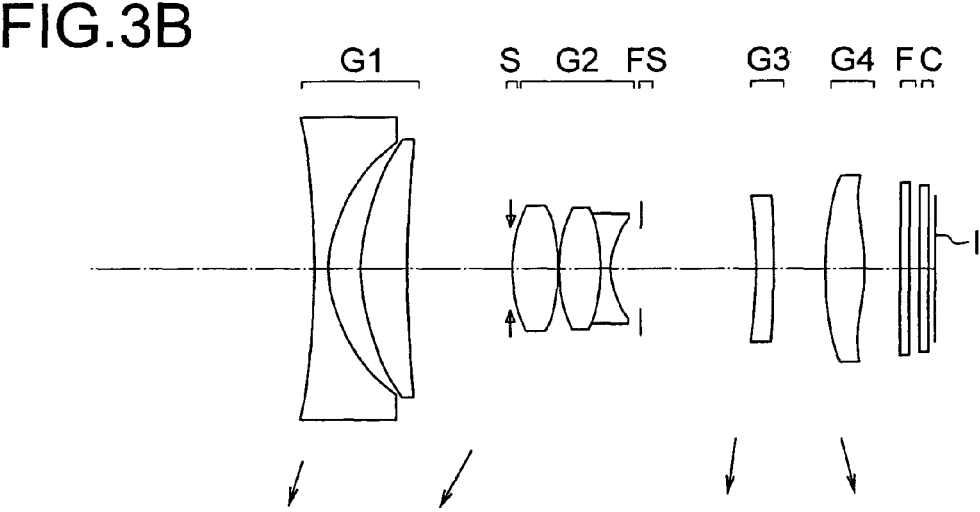
Figure 3C:
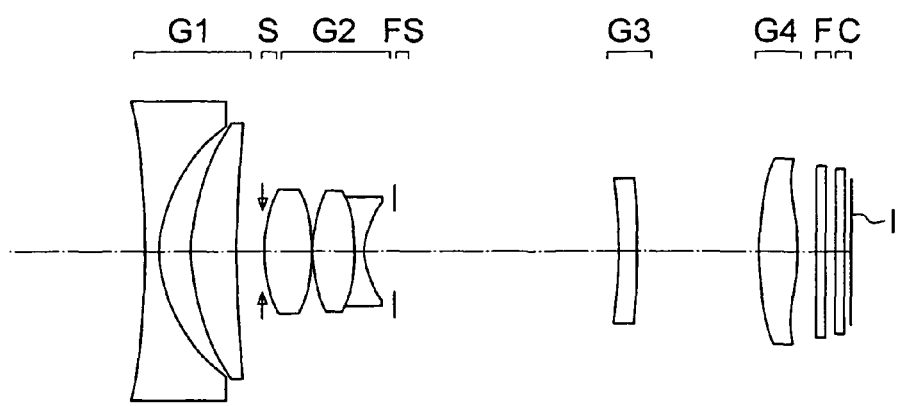

As shown in FIGS. 3A, 3B, and 3C, the zoom lens according to the first embodiment includes, in order from the object side thereof, a first lens unit G1 having a negative refracting power, an aperture stop S, a second lens unit G2 having a positive refracting power, a flare stop FS, a third lens unit G3 having a negative refracting power, and a fourth lens unit G4 having a positive refracting power.

During zooming from the wide angle end to the telephoto end, the first lens unit G1 moves first toward the image side and thereafter toward the object side, the second lens unit G2 moves toward the object side, the third lens unit G3 moves toward the object side, and the fourth lens unit G4 moves toward the image side.

The first lens unit G1 is composed of a biconcave negative lens and a positive meniscus lens having a convex surface directed toward the object side. The second lens unit G2 is composed of a biconvex positive lens, and a cemented lens made up of a biconvex positive lens and a biconcave negative lens. The third lens unit G3 is composed of a negative meniscus lens having a convex surface directed toward the image side. The fourth lens unit G4 is composed of a biconvex positive lens. All the lens elements in each lens unit G1, G2, G3, G4 are arranged in the mentioned order from the object side.

The following seven lens surfaces are aspheric surfaces: both surfaces of the biconcave negative lens in the first lens unit G1, both surfaces of the biconvex positive lens located closest to the object side in the second lens unit G2, the image side surface of the negative meniscus lens in the third lens unit G3, and both surfaces of the biconvex positive lens in the fourth lens unit G4.

Figure 4A:
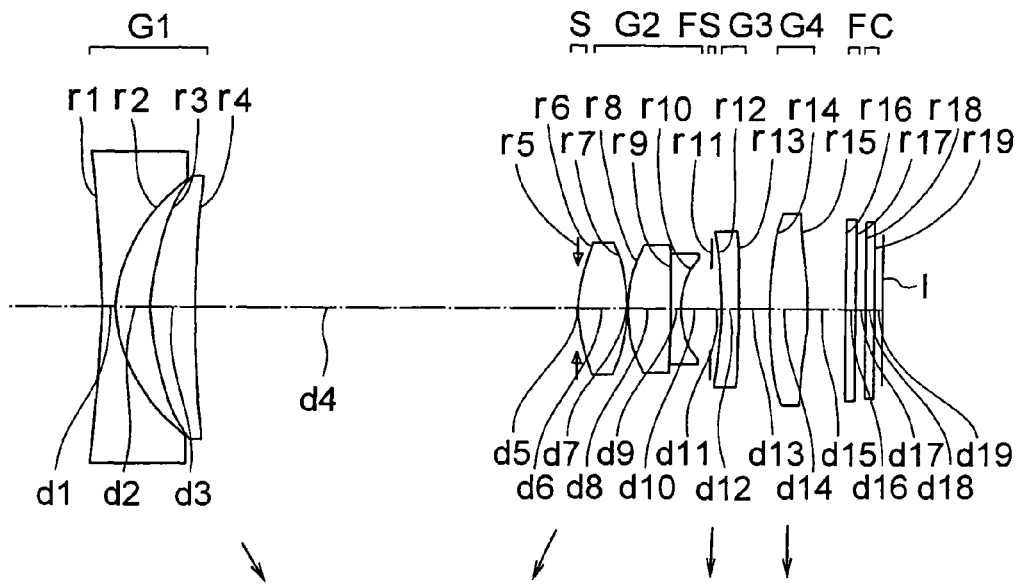
FIGS. 4A, 4B, and 4C are cross sectional views similar to FIGS. 1A, 1B, and 1C, showing a zoom lens according to a fourth embodiment of the present invention.
Figure 4B:
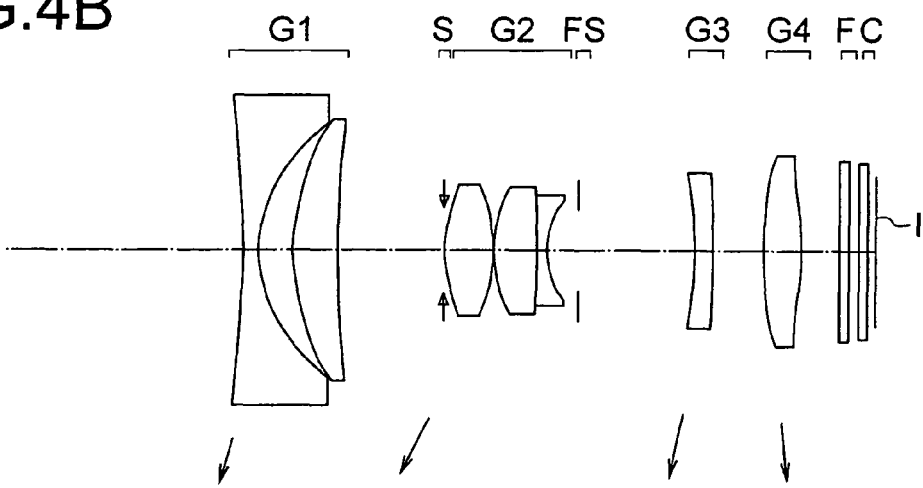
Figure 4C:
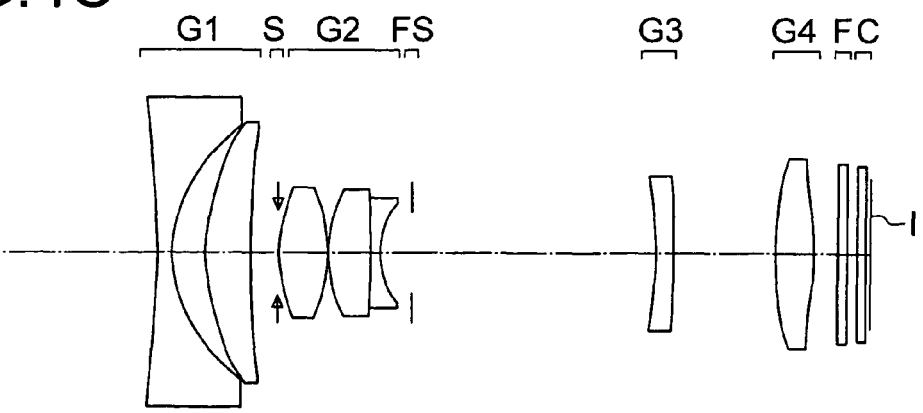
Figure 5A:
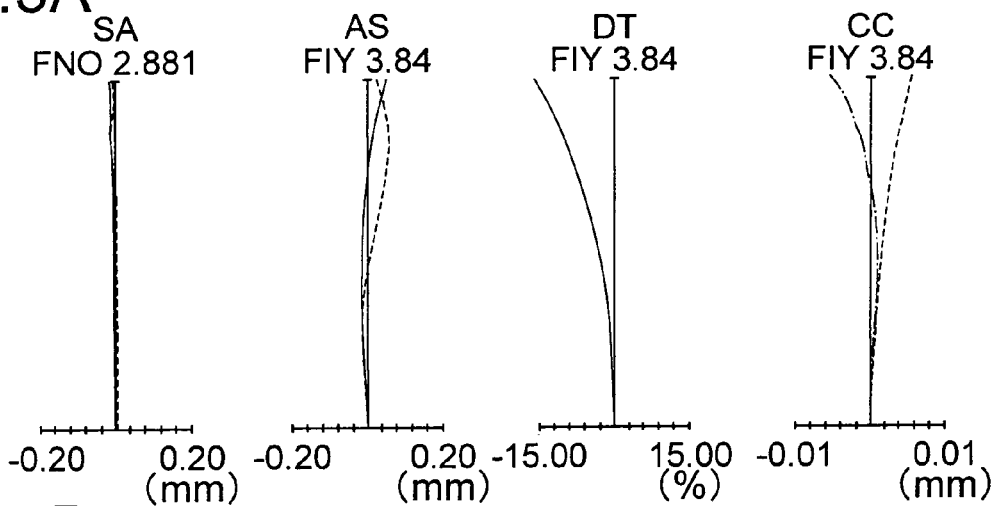
FIGS. 5A, 5B, and 5C are diagrams showing spherical aberration, astigmatism, distortion, and chromatic aberration of magnification of the first embodiment in the state in which the zoom lens is focused on an object point at infinity respectively at the wide angle end (FIG. 5A), in the intermediate state (FIG. 5B), and at the telephoto end (FIG. 5C)
Figure 5B:
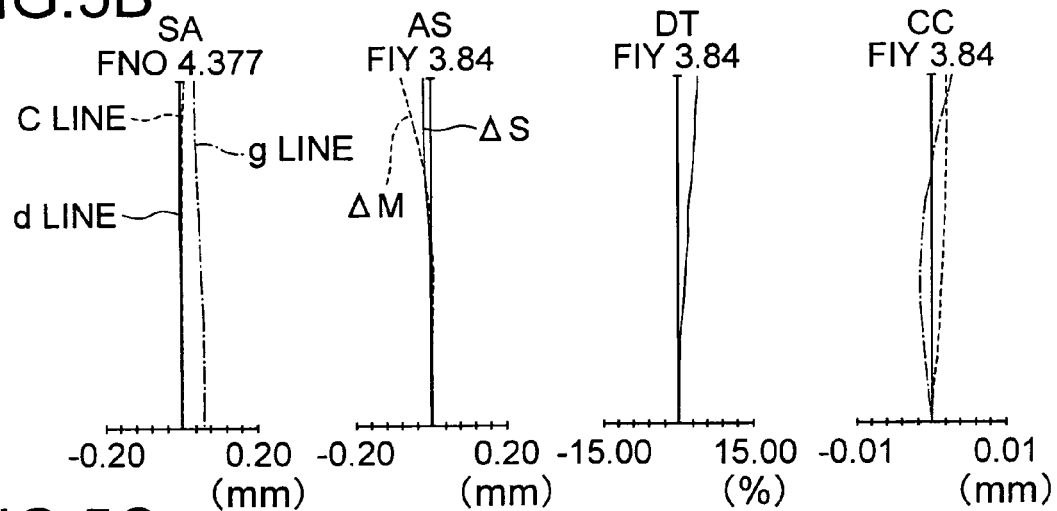
Figure 5C:
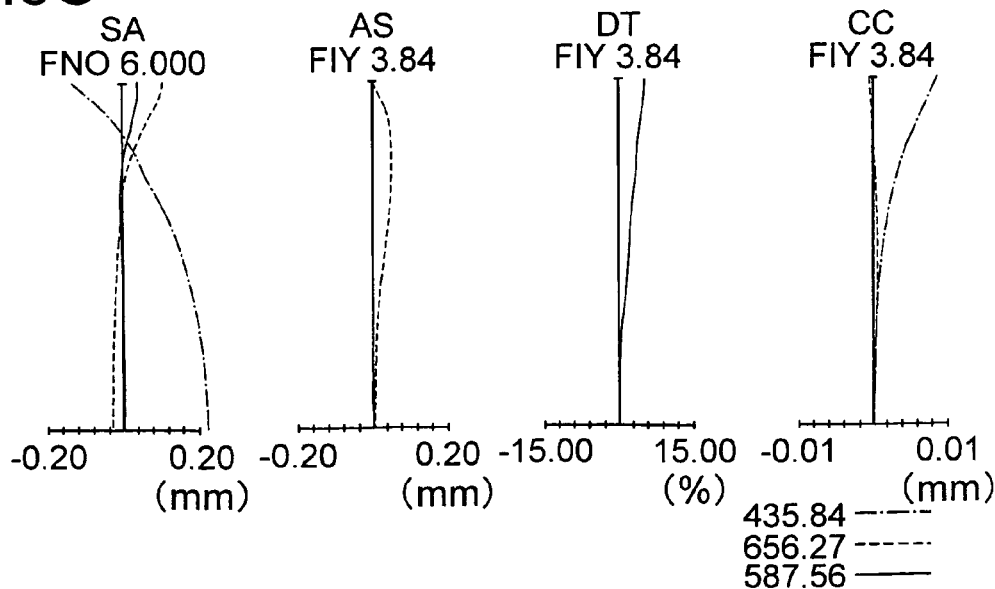
Figure 6A:
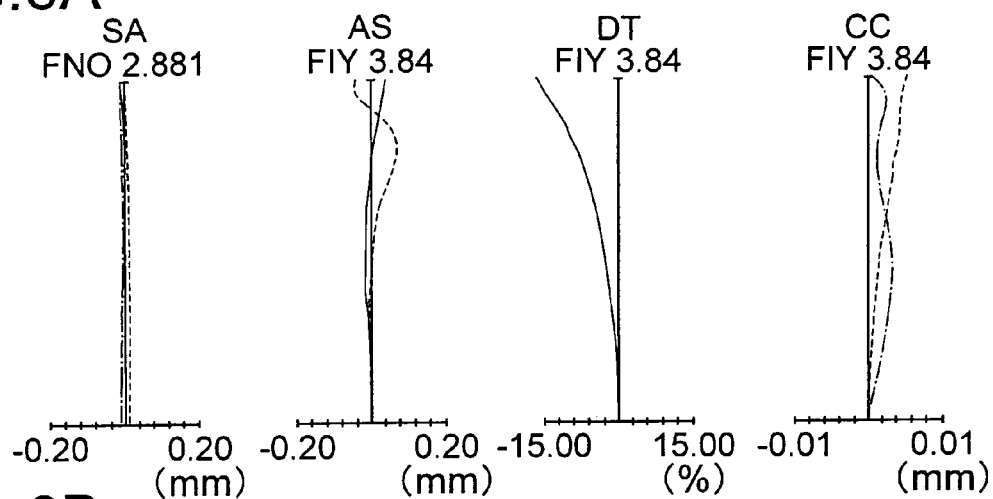
FIGS. 6A, 6B, and 6C are diagrams similar to FIGS. 5A, 5B, and 5C for the second embodiment in the state in which the zoom lens is focused on an object point at infinity.
Figure 6B:
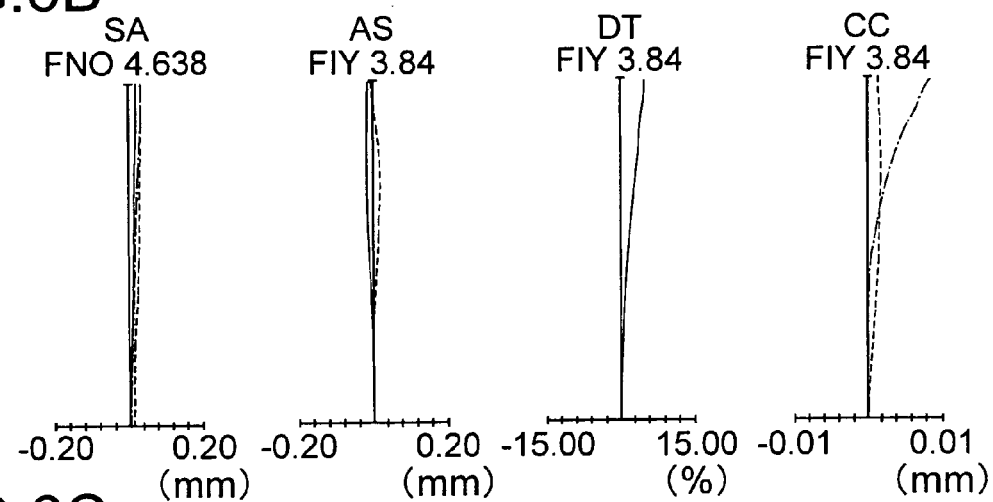
Figure 6C:
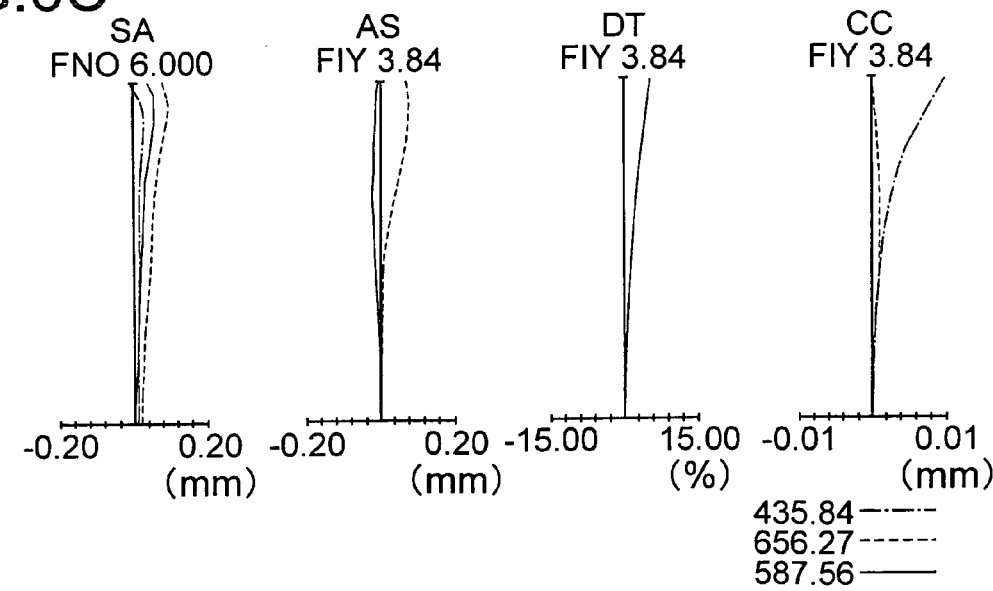
Figure 7A:
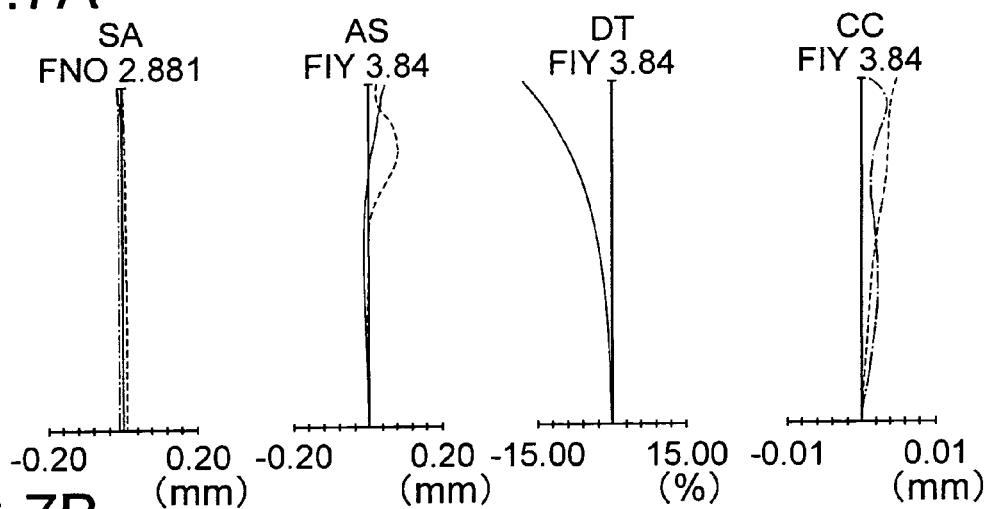
FIGS. 7A, 7B, and 7C are diagrams similar to FIGS. 5A, 5B, and 5C for the third embodiment in the state in which the zoom lens is focused on an object point at infinity.
Figure 7B:
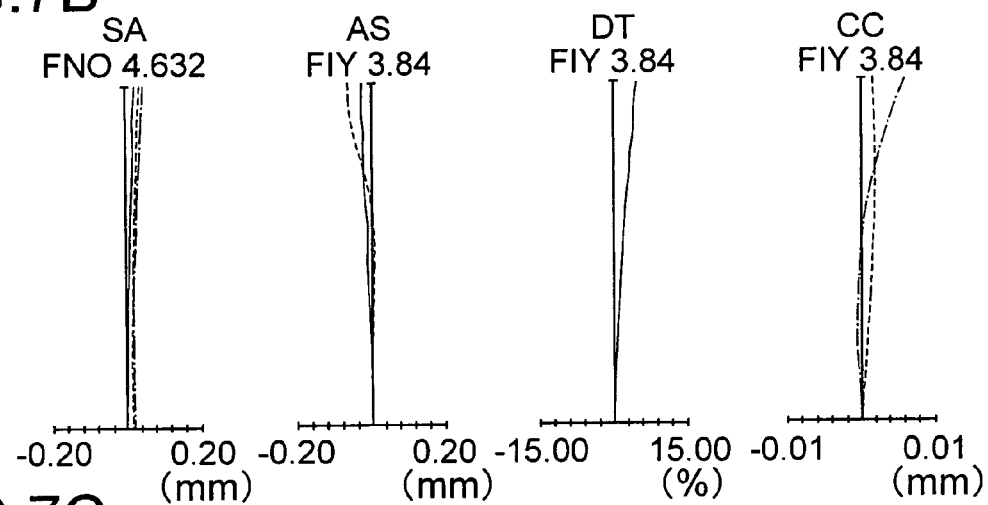
Figure 7C:
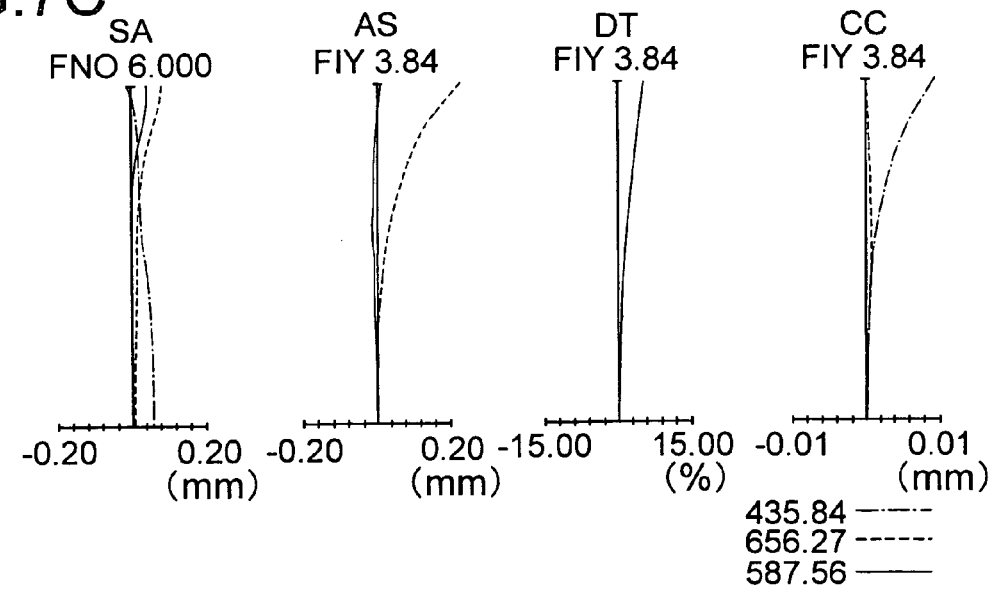
Figure 8A:
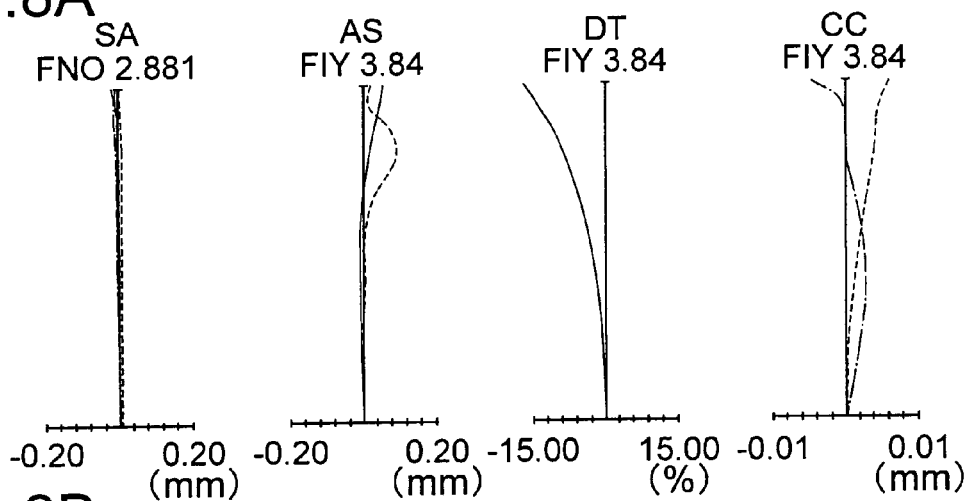
FIGS. 8A, 8B, and 8C are diagrams similar to FIGS. 5A, 5B, and 5C for the fourth embodiment in the state in which the zoom lens is focused on an object point at infinity.
Figure 8B:
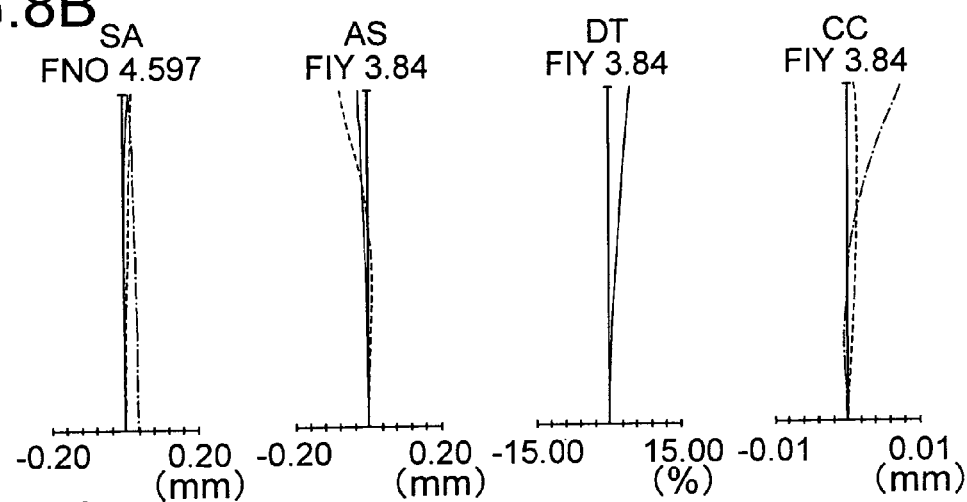
Figure 8C:
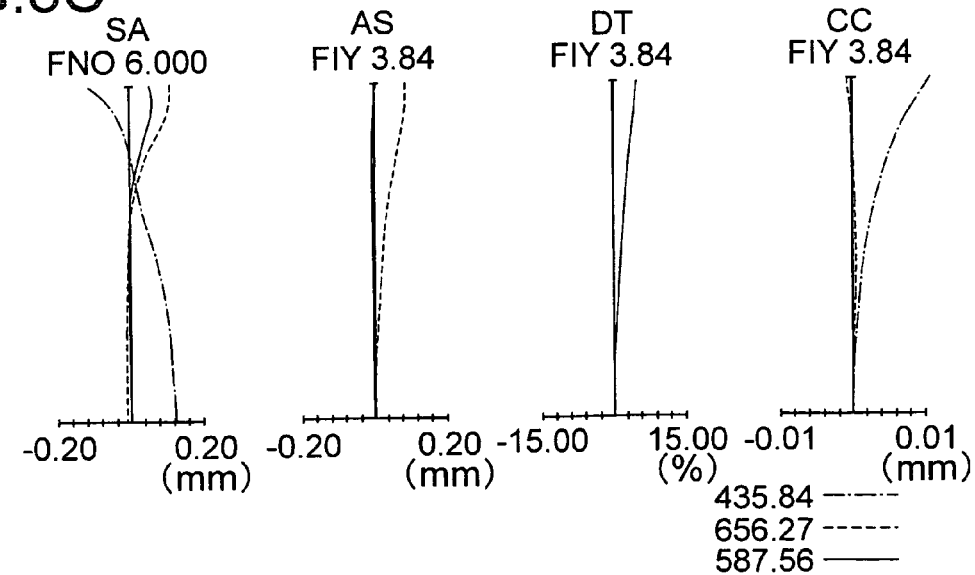

As shown in FIGS. 4A, 4B, and 4C, the zoom lens according to the first embodiment includes, in order from the object side thereof, a first lens unit G1 having a negative refracting power, an aperture stop S, a second lens unit G2 having a positive refracting power, a flare stop FS, a third lens unit G3 having a negative refracting power, and a fourth lens unit G4 having a positive refracting power.

During zooming from the wide angle end to the telephoto end, the first lens unit G1 moves first toward the image side and thereafter toward the object side, the second lens unit G2 moves toward the object side, the third lens unit G3 moves toward the object side, and the fourth lens unit G4 moves toward the image side.

The first lens unit G1 is composed of a biconcave negative lens and a positive meniscus lens having a convex surface directed toward the object side. The second lens unit G2 is composed of a biconvex positive lens, and a cemented lens made up of a biconvex positive lens and a biconcave negative lens. The third lens unit G3 is composed of a negative meniscus lens having a convex surface directed toward the image side. The fourth lens unit G4 is composed of a biconvex positive lens. All the lens elements in each lens unit G1, G2, G3, G4 are arranged in the mentioned order from the object side.

The following seven lens surfaces are aspheric surfaces: both surfaces of the biconcave negative lens in the first lens unit G1, both surfaces of the biconvex positive lens located closest to the object side in the second lens unit G2, the image side surface of the negative meniscus lens in the third lens unit G3, and both surfaces of the biconvex positive lens in the fourth lens unit G4.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When Z is let to be an optical axis with a direction of traveling of light as a positive (direction), and Y is let to be in a direction orthogonal to the optical axis, a shape of the aspheric surface is described by the following expression.

$$Z=(Y^2/r)/[1+\{1-(1+K)(Y/r)^2\}^{1/2}]+A_4Y^4+A_6Y^6+A_8Y^8+A_{10}Y^{10}+A_{12}Y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

| unit mm | | | | |
|---|---|---|---|---|
| Surface data | | | | |
| Surface No | r | d | nd | vd |
| Object plane | ∞ | ∞ | | |
| 1* | −48.083 | 0.70 | 1.85135 | 40.10 |
| 2* | 6.768 | 1.40 | | |
| 3 | 10.334 | 1.90 | 2.00170 | 20.64 |
| 4 | 26.408 | Variable | | |
| 5(S) | ∞ | 0.00 | | |
| 6* | 6.002 | 2.15 | 1.49700 | 81.54 |
| 7* | −11.385 | 0.05 | | |
| 8 | 5.479 | 1.70 | 1.88300 | 40.76 |
| 9 | 68.227 | 0.50 | 2.00330 | 28.27 |
| 10 | 3.568 | 1.65 | | |
| 11 | ∞ | Variable | | |
| 12 | −49.269 | 0.70 | 1.49700 | 81.54 |
| 13* | 25.077 | Variable | | |
| 14* | 19.132 | 1.90 | 1.85135 | 40.10 |
| 15* | −17.405 | Variable | | |
| 16 | ∞ | 0.50 | 1.53996 | 59.45 |
| 17 | ∞ | 0.50 | | |
| 18 | ∞ | 0.49 | 1.51633 | 64.14 |
| 19 | ∞ | 0.36 | | |
| Image plane | ∞ | | | |
| Aspherical coefficients | | | | |
| 1st surface | | | | |

K = 0.000
A4 = 2.20847e−04, A6 = −5.71991e−06, A8 = 5.00877e−08
2nd surface

K = 0.000
A4 = −4.56869e−05, A6 = −1.68478e−06, A8 = −3.14664e−07,
A10 = 1.49291e−09

-continued unit mm

6th surface

K = 0.000
A4 = −6.82322e−04, A6 = −1.81824e−05, A8 = −1.16955e−06
7th surface

K = 0.000
A4 = 3.16920e−04, A6 = −1.93076e−05, A8 = −4.66867e−07
13th surface

K = 0.000
A4 = 1.98305e−04, A6 = −1.31640e−05
14th surface

K = 0.000
A4 = 5.00000e−04
15th surface

K = 0.000
A4 = 9.87383e−04, A6 = −8.17534e−06, A8 = 1.62332e−07,
A10 = −3.43516e−09

Zoom data

|  | WE | ST | TE |
|---|---|---|---|
| IH | 3.84 | 3.84 | 3.84 |
| focal length | 5.07 | 11.51 | 24.35 |
| Fno. | 2.88 | 4.38 | 6.00 |
| 2ω(°) | 84.31 | 35.56 | 17.05 |
| bf | 3.51 | 3.47 | 2.68 |
| total length | 36.66 | 31.42 | 36.62 |
| d4 | 17.41 | 6.09 | 1.50 |
| d11 | 1.00 | 5.19 | 13.91 |
| d13 | 2.10 | 4.03 | 5.89 |
| d15 | 2.00 | 1.97 | 1.17 |

Unit focal length

| f1 = −13.51 | f2 = 9.76 | f3 = −33.33 | f4 = 10.97 |
|---|---|---|---|

Example 2 unit mm

Surface data

| Surface No | r | d | nd | vd |
|---|---|---|---|---|
| Object plane | ∞ | ∞ | | |
| 1* | −27.016 | 0.70 | 1.85135 | 40.10 |
| 2* | 7.610 | 1.70 | | |
| 3 | 13.311 | 2.20 | 1.92286 | 20.88 |
| 4 | 93.847 | Variable | | |
| 5(S) | ∞ | 0.00 | | |
| 6* | 6.462 | 2.50 | 1.49700 | 81.54 |
| 7* | −11.052 | 0.00 | | |
| 8 | 7.271 | 2.20 | 1.88300 | 40.76 |
| 9 | −9.443 | 0.50 | 1.90366 | 31.32 |
| 10 | 3.961 | 1.65 | | |
| 11 | ∞ | Variable | | |
| 12 | −22.783 | 1.10 | 1.49700 | 81.54 |
| 13* | −60.731 | Variable | | |
| 14* | 34.126 | 2.00 | 1.77377 | 47.17 |
| 15* | −12.529 | Variable | | |
| 16 | ∞ | 0.50 | 1.53996 | 59.45 |
| 17 | ∞ | 0.50 | | |
| 18 | ∞ | 0.49 | 1.51633 | 64.14 |
| 19 | ∞ | 0.36 | | |
| Image plane | ∞ | | | |

-continued unit mm

Aspherical coefficients

1st surface

K = 0.000
A4 = 4.47752e−04, A6 = −8.91704e−06, A8 = 5.85976e−08
2nd surface

K = 0.000
A4 = 1.30254e−04, A6 = −1.83562e−06, A8 = −3.59895e−07,
A10 = 3.46324e−09
6th surface K = 0.000
A4 = −8.80733e−04, A6 = −2.63541e−05, A8 = −2.19176e−06
7th surface K = 0.000
A4 = 3.66913e−06, A6 = −3.40917e−05, A8 = −1.13661e−06
13th surface K = 0.000
A4 = 1.98305e−04, A6 = −1.31640e−05
14th surface K = 0.000
A4 = 4.71006e−04
15th surface K = 0.000
A4 = 9.51166e−04, A6 = 8.56015e−07

Zoom data

|  | WE | ST | TE |
|---|---|---|---|
| IH | 3.84 | 3.84 | 3.84 |
| focal length | 4.53 | 11.60 | 21.74 |
| Fno. | 2.88 | 4.64 | 6.00 |
| 2ω(°) | 91.24 | 35.06 | 19.06 |
| bf | 4.01 | 3.67 | 2.81 |
| total length | 40.23 | 33.04 | 37.90 |
| d4 | 19.84 | 5.45 | 1.50 |
| d11 | 0.23 | 6.88 | 13.04 |
| d13 | 1.60 | 2.50 | 6.00 |
| d15 | 2.51 | 2.16 | 1.31 |

Unit focal length

| f1 = −14.18 | f2 = 10.62 | f3 = −74.07 | f4 = 12.07 |
|---|---|---|---|

Example 3 unit mm

Surface data

| Surface No | r | d | nd | vd |
|---|---|---|---|---|
| Object plane | ∞ | ∞ | | |
| 1* | −30.301 | 0.70 | 1.85135 | 40.10 |
| 2* | 7.369 | 1.70 | | |
| 3 | 12.063 | 2.40 | 1.92286 | 20.88 |
| 4 | 52.975 | Variable | | |
| 5(S) | ∞ | 0.00 | | |
| 6* | 6.148 | 2.50 | 1.49700 | 81.54 |
| 7* | −10.920 | 0.05 | | |
| 8 | 7.355 | 2.20 | 1.88300 | 40.76 |
| 9 | −8.823 | 0.50 | 1.90366 | 31.32 |
| 10 | 3.900 | 1.65 | | |
| 11 | ∞ | Variable | | |
| 12 | −30.701 | 0.90 | 1.49700 | 81.54 |

-continued unit mm

| | | | | |
|---|---|---|---|---|
| 13* | −422.356 | Variable | | |
| 14* | 29.420 | 2.00 | 1.85135 | 40.10 |
| 15* | −14.825 | Variable | | |
| 16 | ∞ | 0.50 | 1.53996 | 59.45 |
| 17 | ∞ | 0.50 | | |
| 18 | ∞ | 0.49 | 1.51633 | 64.14 |
| 19 | ∞ | 0.36 | | |
| Image plane | ∞ | | | |

Aspherical coefficients

1st surface

K = 0.000
A4 = 5.05758e−04, A6 = −1.12252e−05, A8 = 7.90775e−08
2nd surface

K = 0.000
A4 = 2.15817e−04, A6 = −2.63060e−06, A8 = −4.76639e−07,
A10 = 5.15438e−09
6th surface K = 0.000
A4 = −8.68109e−04, A6 = −2.65511e−05, A8 = −1.34727e−06
7th surface K = 0.000
A4 = 1.56167e−04, A6 = −3.19277e−05, A8 = −4.07166e−07
13th surface K = 0.000
A4 = 1.98305e−04, A6 = −1.31640e−05
14th surface K = 0.000
A4 = 7.71052e−04
15th surface K = 0.000
A4 = 1.33872e−03, A6 = −4.76756e−06, A8 = 9.00844e−08

Zoom data

| | WE | ST | TE |
|---|---|---|---|
| IH | 3.84 | 3.84 | 3.84 |
| focal length | 4.53 | 11.50 | 21.74 |
| Fno. | 2.88 | 4.63 | 6.00 |
| 2ω(°) | 91.71 | 35.39 | 19.11 |
| bf | 3.71 | 3.39 | 2.61 |
| total length | 39.66 | 32.68 | 37.37 |
| d4 | 19.37 | 5.47 | 1.50 |
| d11 | 0.38 | 6.22 | 12.06 |
| d13 | 1.60 | 3.00 | 6.60 |
| d15 | 2.20 | 1.88 | 1.11 |

Unit focal length

| | | | |
|---|---|---|---|
| f1 = −13.96 | f2 = 10.33 | f3 = −66.67 | f4 = 11.82 |

Example 4 unit mm

Surface data

| Surface No | r | d | nd | vd |
|---|---|---|---|---|
| Object plane | ∞ | ∞ | | |
| 1* | −31.636 | 0.70 | 1.85135 | 40.10 |
| 2* | 7.240 | 1.70 | | |
| 3 | 11.787 | 2.40 | 1.92286 | 20.88 |
| 4 | 48.425 | Variable | | |
| 5(S) | ∞ | 0.00 | | |
| 6* | 6.348 | 2.50 | 1.49700 | 81.54 |
| 7* | −9.947 | 0.05 | | |
| 8 | 6.622 | 2.20 | 1.88300 | 40.76 |
| 9 | −97.640 | 0.50 | 2.00330 | 28.27 |
| 10 | 3.863 | 1.65 | | |
| 11 | ∞ | Variable | | |
| 12 | −23.453 | 0.90 | 1.49700 | 81.54 |
| 13* | −422.356 | Variable | | |
| 14* | 25.456 | 2.00 | 1.85135 | 40.10 |
| 15* | −14.860 | Variable | | |
| 16 | ∞ | 0.50 | 1.53996 | 59.45 |
| 17 | ∞ | 0.50 | | |
| 18 | ∞ | 0.49 | 1.51633 | 64.14 |
| 19 | ∞ | 0.36 | | |
| Image plane | ∞ | | | |

Aspherical coefficients

1st surface

K = 0.000
A4 = 5.68001e−04, A6 = −1.20030e−05, A8 = 8.15486e−08
2nd surface

K = 0.000
A4 = 2.82841e−04, A6 = −2.88733e−07, A8 = −5.89488e−07,
A10 = 5.87539e−09
6th surface K = 0.000
A4 = −8.90873e−04, A6 = −2.94121e−05, A8 = −1.92528e−06
7th surface K = 0.000
A4 = 1.31105e−04, A6 = −3.51792e−05, A8 = −8.90851e−07
13th surface K = 0.000
A4 = 1.98305e−04, A6 = −1.31640e−05
14th surface K = 0.000
A4 = 5.00000e−04
15th surface K = 0.000
A4 = 1.04752e−03, A6 = −1.19212e−05, A8 = 4.55281e−07,
A10 = −7.25591e−09

Zoom data

| | WE | ST | TE |
|---|---|---|---|
| IH | 3.84 | 3.84 | 3.84 |
| focal length | 4.53 | 11.50 | 21.74 |
| Fno. | 2.88 | 4.60 | 6.00 |
| 2ω(°) | 91.40 | 35.38 | 19.06 |
| bf | 3.51 | 3.44 | 2.71 |
| total length | 39.66 | 32.32 | 36.83 |
| d4 | 19.52 | 5.44 | 1.50 |
| d11 | 0.43 | 5.84 | 12.53 |
| d13 | 1.60 | 3.00 | 5.50 |
| d15 | 2.00 | 1.93 | 1.20 |

Unit focal length

| | | | |
|---|---|---|---|
| f1 = −13.83 | f2 = 10.09 | f3 = −50.00 | f4 = 11.28 |

FIGS. 5A through 8C are aberration diagrams of the zoom lenses according to the first to the fourth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 5A, 6A, 7A, and 8A, in the intermediate focal length state in FIGS. 5B, 6B, 7B, and 8B, and at the telephoto end in FIGS. 5C, 6C, 7C, and 8C. In these diagrams, "FIY" represents the maximum image height.

In the following, values corresponding to conditional expressions (1) to (14) are presented for the respective embodiments.

| | Example 1 | Example 2 | Example 3 | Example 4 |
|---|---|---|---|---|
| (1) $\beta_{2(t)}/\beta_{2(w)}$ | 4.102 | 4.064 | 4.058 | 4.171 |
| (2) $\beta_{3(t)}/\beta_{3(w)}$ | 1.046 | 1.022 | 1.037 | 1.037 |
| (3) $\beta_{4(t)}/\beta_{4(w)}$ | 1.119 | 1.155 | 1.141 | 1.109 |
| (4) $nd_{11}$ | 1.85135 | 1.85135 | 1.85135 | 1.85135 |
| (5) $nd_{12}$ | 2.00170 | 1.92286 | 1.92286 | 1.92286 |
| (6) enp(w)/IH(max) | 2.019 | 2.057 | 2.057 | 2.057 |
| (7) $(r_{11a}+r_{11b})/(r_{11a}-r_{11b})$ | 0.753 | 0.560 | 0.609 | 0.628 |
| (8) $(r_{31a}+r_{31b})/(r_{31a}-r_{31b})$ | 0.325 | -2.201 | -1.157 | -1.118 |
| (9) $f_t/f_w$ | 4.803 | 4.799 | 4.799 | 4.799 |
| (10) $(r_{41a}+r_{41b})/(r_{41a}-r_{41b})$ | 0.047 | 0.463 | 0.330 | 0.263 |
| (11) $\Delta ASP_{41b}/\Delta SP_{41a}$ | 1.782 | 2.046 | 1.670 | 1.895 |
| (12) $Dg_3$/IH(max) | -0.771 | -0.833 | -1.018 | -0.807 |
| (13) $P_4/P_2$ | 0.890 | 0.880 | 0.873 | 0.895 |
| (14) $P_3/P_1$ | 0.405 | 0.191 | 0.209 | 0.277 |
| $\Delta ASP_{41a}$ | 0.1087 | 0.1024 | 0.1677 | 0.1087 |
| $\Delta ASP_{41b}$ | 0.1938 | 0.2096 | 0.2801 | 0.2060 |
| enp (w) | 7.752 | 7.900 | 7.900 | 7.900 |
| the image height under the electrical distortion correction (wide angle end) | 3.55 | 3.54 | 3.53 | 3.54 |
| the total image angle under the electrical distortion correction (wide angle end) | 80 | 84.26 | 84 | 84.13 |

For preventing the occurrence of the ghost and the flare, generally, the antireflection coating is applied to a surface of a lens in contact with air. On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases.

However, when the antireflection coating is applied positively even to the cemented surface, it is possible to reduce further the ghost and the flare, and to achieve a more favorable image. Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. As a coating material to be used, according to a refractive index of the adhesive material and a refractive index of the lens which is abase, coating materials such as $Ta_2O_5$, $TiO_2$, $Nb_2O_5$, $ZrO_2$, $HfO_2$, $CeO_2$, $SnO_2$, $In_2O_3$, ZnO, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics. Moreover, it is needless to mention that for the cemented surface of lenses other than the lenses in the first lens unit, it is effective to apply the coating on the cemented surface based on a similar idea.

(Signal Processing for Distortion)

In the zoom lenses according to the embodiments, barrel occurs on the rectangular photoelectric conversion surface, at the wide angle end. Whereas, at the telephoto end and near the intermediate focal length state, distortion is suppressed. To correct distortion electrically, the effective image pickup area is designed to have a barrel shape at the wide angle end and a rectangular shape near the intermediate focal length position and at the telephoto end. In addition, the effective image pickup area; which has been set in advance, is transformed into rectangular image information with reduced distortion by image transformation using image processing. The maximum image height $IH_w$ at the wide angle end is designed to be smaller than the maximum image height $IH_s$ at the intermediate focal length state and the maximum image height $IH_t$ at the telephoto end.

(Signal Processing for Correction of Chromatic Aberration of Magnification)

In electronic still cameras, an image of an object is generally separated into images of three primary colors or first, second, and third primary colors, and a color image is reproduced by superimposing the output signals of the respective colors by computation. In a case where the zoom lens has chromatic aberration of magnification, if the image with the first primary color light is taken as a reference, the positions at which the images with the second primary color light and the third primary color light are formed will be displaced from the position at which the image with the first primary color light is formed.

In order to electrically correct chromatic aberration of magnification of an image, the amounts of displacement of the image positions with the second primary color light and the third-primary color light relative to the image position with the first primary color light are obtained in advance for each pixel of the image pickup element based on information on the aberration of the zoom lens. Then, coordinate transformation may be performed for each pixel of a picked up image in such a way that the displacement relative to the image position with the first primary color light is corrected. In a case, for example, where an image is composed of three primary color output signals of red (R), green (G), and blue (B), displacements in the R and B image positions from the G image position may be obtained for each pixel in advance, and coordinate transformation may be performed on the picked up image to correct or eliminate displacement from the G image position, and R and B signals after correction may be output.

Since chromatic aberration of magnification changes depending on the zoom position, the focus position, and the stop value, it is preferred that displacement amounts of the image positions with the second and the third primary colors relative to the image position with the first primary color for every lens position (i.e. zoom position, focus position and stop value) be stored as correction data in a memory device. Such correction data may be referred to in accordance with the lens position. Thus, the second and third primary color signals that have been corrected in terms of displacement relative to the first primary color signal can be output.

Either the third lens unit or the fourth lens unit may be adapted to be moved during focusing. In the embodiments for which numerical data have been present above, the aperture stop is disposed immediately in front and on the object side of the second lens unit, and the flare stop is disposed immediately in rear and on the image side of the second lens unit.

(Correction of Distortion)

Incidentally, when the zoom lens system of the present invention is used, a digital correction of distortion of an image is carried out electrically. A basic concept for the digital correction of the distortion of an image will be described below.

Figure 9:
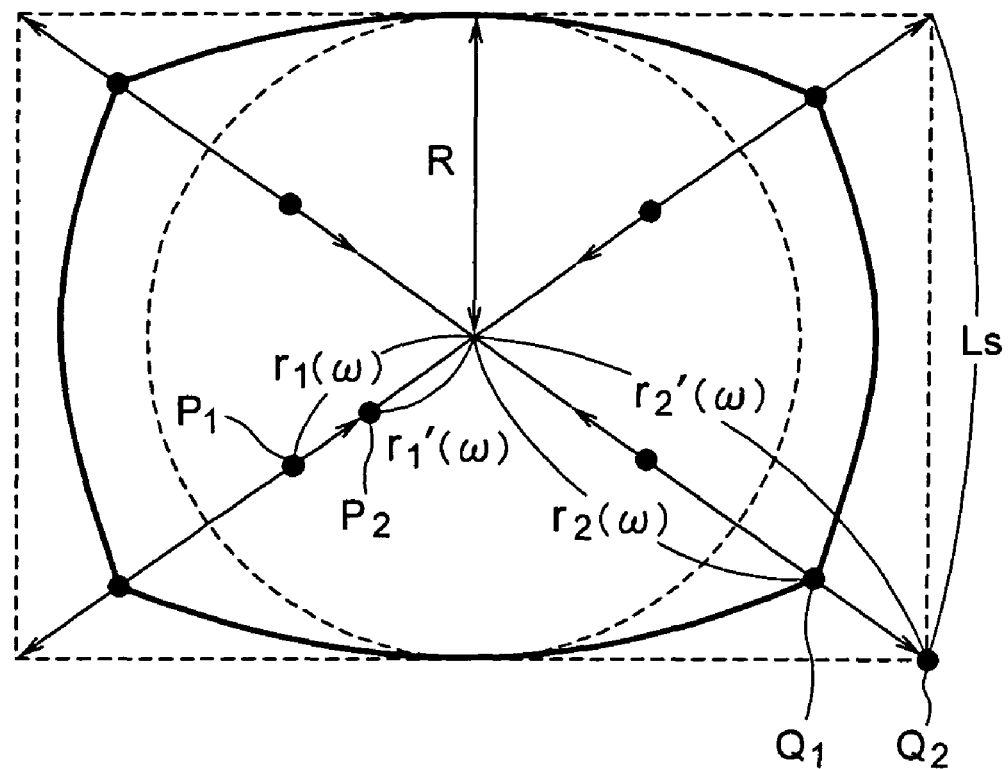
FIG. 9 is a diagram illustrating correction of distortion.

For example, as shown in FIG. 9, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 9, a point $P_1$ on a circumference of an arbitrary radius $r_1(\omega)$ positioned at an inner side of a circle of radius R is moved to a point $P_2$ on a circumference of a radius $r_1'(\omega')$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \cdot \tan\omega \quad (0 \leq \alpha \leq 1)$$

where, ω is a half-image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan\omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan\omega$$

near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f>y/\tan \omega.$$

In other words, when the focal length f of the imaging system, and the image height y are let to be fixed, a value of ω becomes large.

(Digital Camera)

Figure 10:
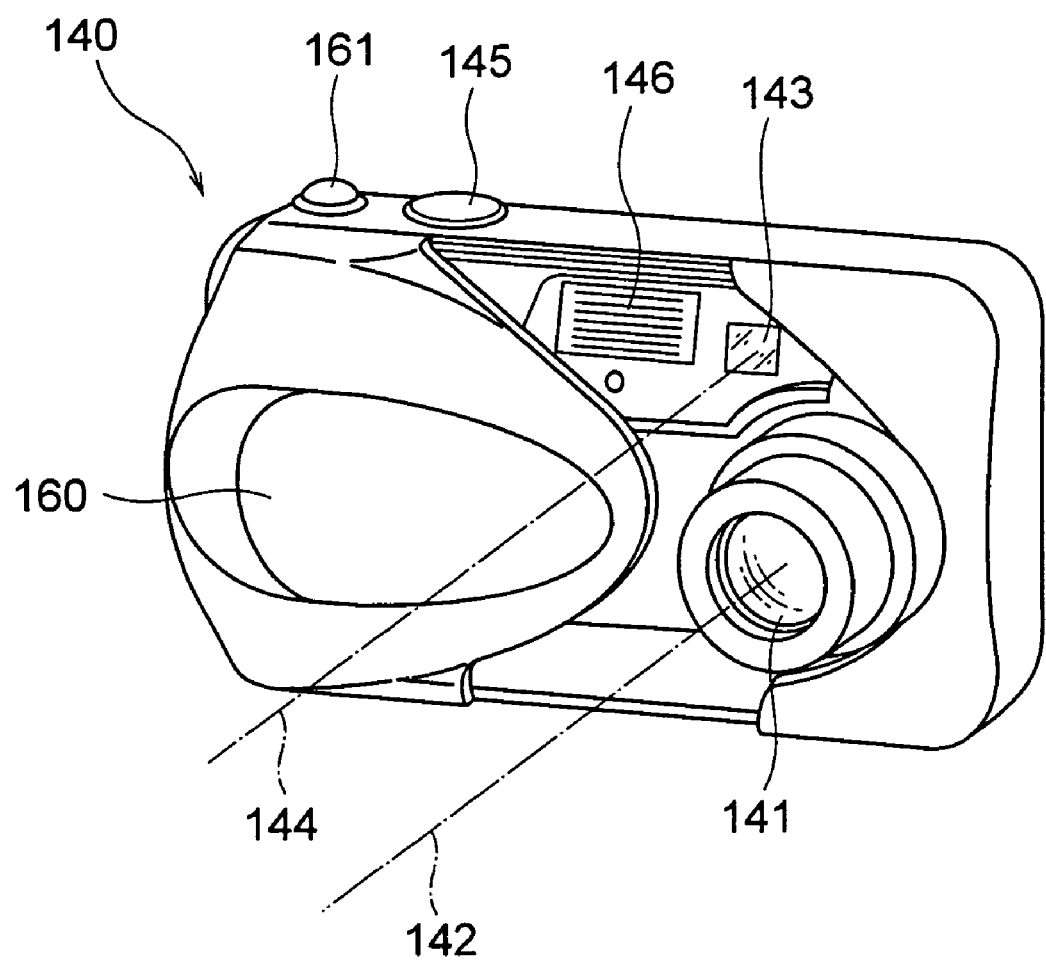
FIG. 10 is a front perspective view showing an outer appearance of a digital camera equipped with a collapsible zoom lens according to the present invention.
Figure 11:
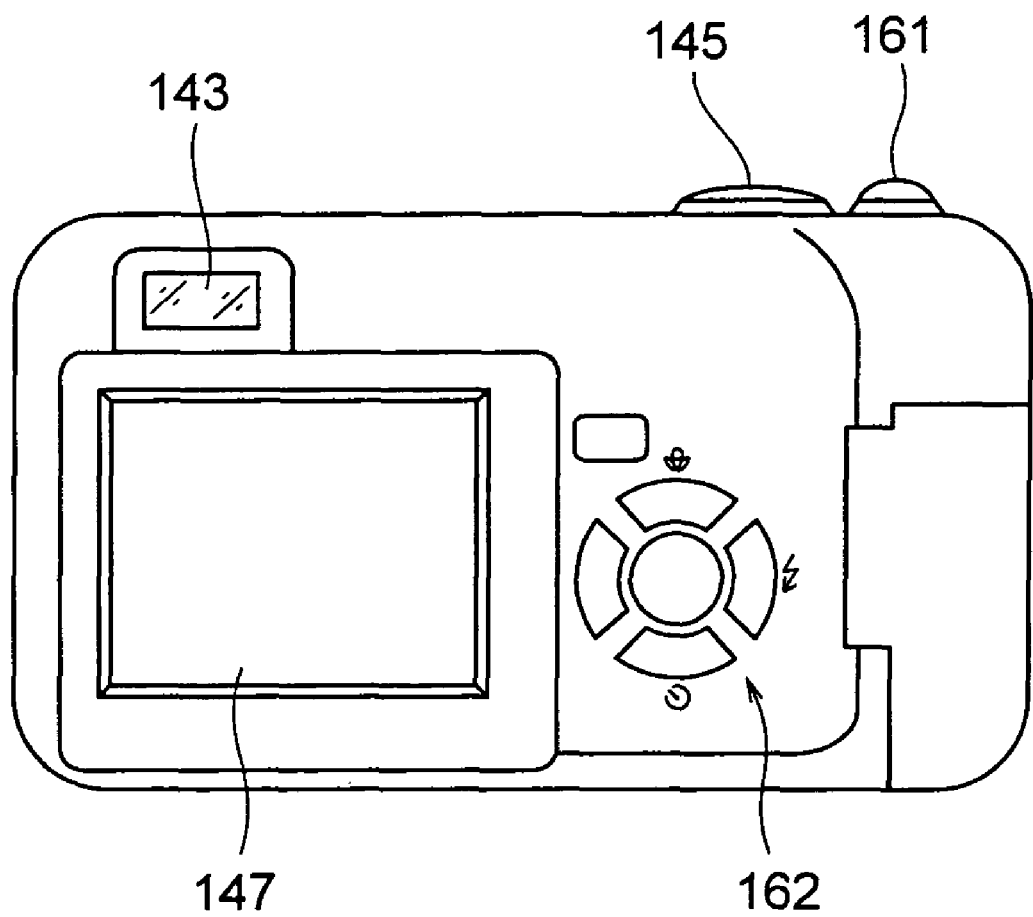
FIG. 11 is a rear view of the digital camera.
Figure 12:
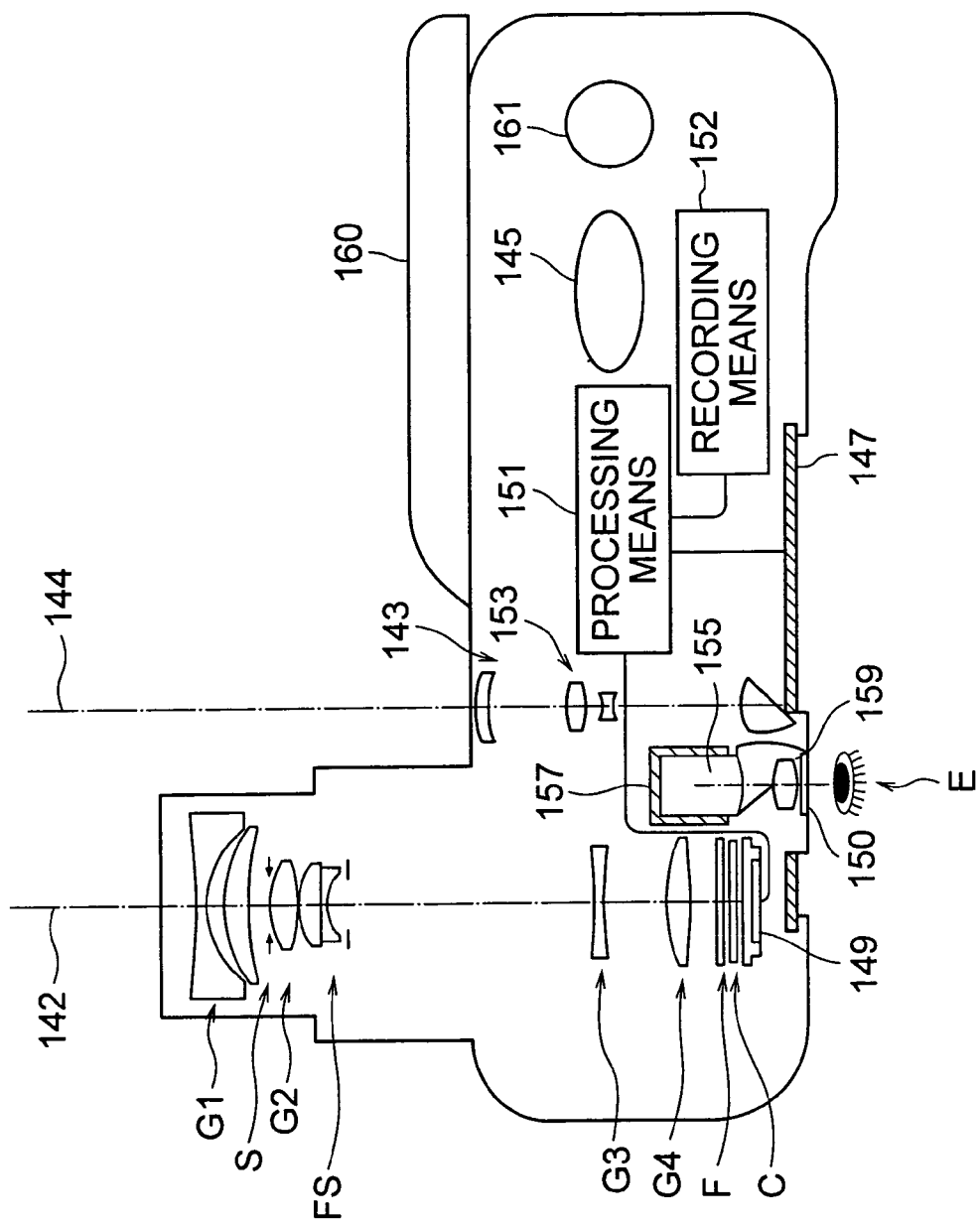
FIG. 12 is a cross sectional view of the digital camera.

FIG. 10 to FIG. 12 are conceptual diagrams of a structure of a digital camera according to the present invention in which a zoom lens system described above is incorporated in a taking optical system 141. FIG. 10 is a front perspective view showing an appearance of a digital camera 140, FIG. 11 is a rear view of the same, and FIG. 12 is a schematic cross-sectional view showing a structure of the digital camera 140. In FIG. 10 and FIG. 12, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 10, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc.

Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 13:
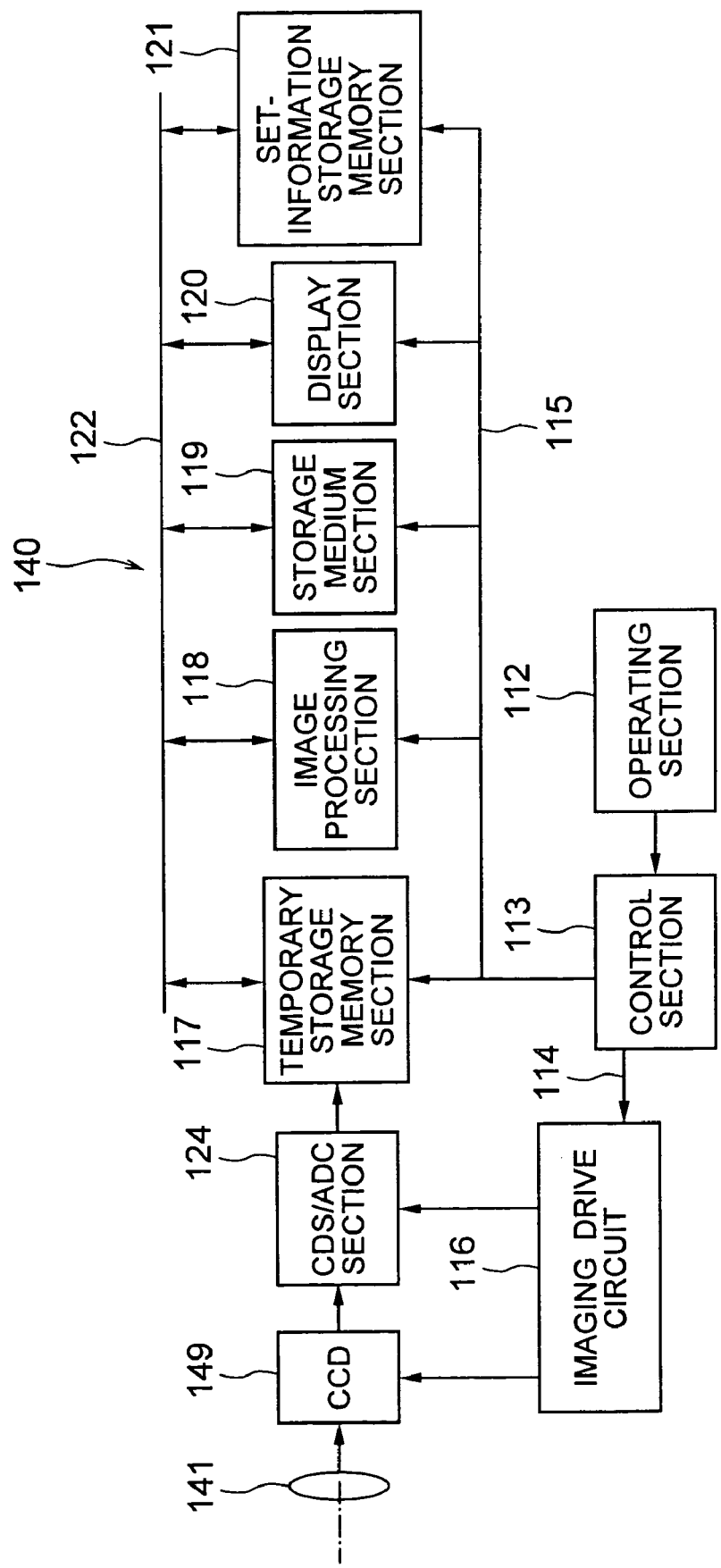
FIG. 13 is a block diagram of an internal circuit of a principal portion of the digital camera.

FIG. 13 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 13, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

Besides the above described modes of the present invention, there may be other modes of the present invention as appended below.

The zoom lens according to the present invention could be constructed, for example, as below:

Further, in addition to the first or the second aspect of the present invention or independently the first or the second aspect of the present invention, it is preferred to satisfy the following configuration.

(Appended Mode 1)

A four unit zoom lens comprising, in order from its object side:

a first lens unit having a negative refracting power;
a second lens unit having a positive refracting power;
a third lens unit having a negative refracting power; and
a fourth lens unit having a positive refracting power, wherein
during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the third lens unit moves, the first lens unit comprises two single lenses of a negative lens element and a positive lens element, the second lens unit comprises, in order from its object side, a positive lens, a positive lens and a negative lens, the third lens unit comprises one lens or two lenses, the fourth lens unit comprises one lens or two lenses.

With this configuration, the zoom lens is the negative front type zoom lens, which is advantageous in reducing the size and in widening the angle of field. Since it is four unit zoom lens, it is advantageous in performing a magnification change by moving the second lens unit. Further, an adjustment of a burden of the magnification change or of aberration can be performed. The fourth lens unit has a function to separate an exit pupil from an image plane.

With such a configuration of each of the lens unit, both of a securement of ratio of the magnification change and a reduction of the aberration can be performed, further it is advantageous in reducing the size, event though few lenses.

The first lens unit has the above mentioned configuration, a principal point of the first lens unit can be made closer to the object side, it is advantageous in reducing a size of radial direction and reducing a total length of the zoom lens.

The second lens unit has the above mentioned configuration, a principal point can be made closer to the object side, it is easy to secure the burden of the magnification change. Further, a balance of Petzval sum can be performed with a preferred correction of spherical aberration. In addition, the positive lens and the negative lens can be cemented in order to correct a chromatic aberration.

A function of the third lens unit and the fourth lens unit can be secured even though less than two lenses. Accordingly, it is preferable to reduce the size during collapse with a reduction of number of lenses.

In the above appended mode, it is more preferred that one or some of the following features or the preferred configuration of the first aspect or the second aspect of the invention.

Further, it is preferred to configure as below:

((Appended Mode 2)

In the four unit zoom lens according to appended mode 1 or any one of the above-mentioned inventions, the third lens unit comprises one lens element, the fourth lens unit comprises one lens element.

With this configuration, both of a cost reduction and a slimming of the zoom lens can be performed.

((Appended Mode 3)

In the four unit zoom lens according to appended mode 1 or appended mode 2, the fourth lens unit is movable during magnification change.

With this configuration, it is advantageous in increasing a magnification during magnification change and in reducing a change of aberration.

((Appended Mode 4)

In the four unit zoom lens according to any on of appended mode 1, appended mode 2, and appended mode 3, or any one of the above-mentioned inventions, the fourth lens unit is moved during focusing.

With this configuration, the four lens unit is a focusing unit, it is advantageous in reducing a drive mechanism burden.

As described in the foregoing, the zoom lens according to the present invention is advantageous in cases where good optical performance and size reduction are to be achieved in a zoom lens having a high zoom ratio.

What is claimed is:
1. A zoom lens comprising, in order from its object side:
a first lens unit having a negative refracting power;
a second lens unit having a positive refracting power;
a third lens unit having a negative refracting power; and
a fourth lens unit having a positive refracting power,
wherein the zoom lens comprises an aperture stop disposed between the first lens unit and the third lens unit, during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end, and the second lens unit and the third lens unit satisfy the following conditional expressions (1) and (2):

$$3.1 < \beta_{2(t)}/\beta_{2(w)} < 6.0 \quad (1)$$

$$1.00 < \beta_{3(t)}/\beta_{3(w)} < 1.25 \quad (2),$$

where $\beta_{2(w)}$ and $\beta_{2(t)}$ are lateral magnifications of the second lens unit respectively at the wide angle end and at the telephoto end, and $\beta_{3(w)}$ and $\beta_{3(t)}$ are lateral magnifications of the third lens unit respectively at the wide angle end and at the telephoto end.

2. The zoom lens according to claim 1, wherein the fourth lens unit moves in such a way as to be located closer to the image side at the telephoto end than at the wide angle end, and the fourth lens unit satisfies the following conditional expression (3):

$$1.02 < \beta_{4(t)}/\beta_{4(w)} < 3.00 \quad (3),$$

where $\beta_{4(w)}$ and $\beta_{4(t)}$ are lateral magnifications of the fourth lens unit respectively at the wide angle end and at the telephoto end.

3. The zoom lens according to claim 1, wherein the third lens unit and the fourth lens unit move during zooming from the wide angle end to the telephoto end.

4. The zoom lens according to claim 1, wherein the first lens unit comprises, in order from the object side, a negative lens component and a positive lens component, and the total number of lens components in the first lens unit is two.

5. The zoom lens according to claim 4, wherein the negative lens component in the first lens unit comprises a negative lens that satisfies the following conditional expression (4):

$$1.80 < nd_{11} < 2.5 \quad (4),$$

where $nd_{11}$ is a refractive index of a certain negative lens in the negative lens component in the first lens unit for the d-line.

6. The zoom lens according to claim 4, wherein the positive lens component in the first lens unit comprises a positive lens that satisfies the following conditional expression (5):

$$1.80 < nd_{12} < 2.5 \quad (5),$$

where $nd_{12}$ is the refractive index of a certain positive lens in the positive lens component in the first lens unit for the d-line.

7. The zoom lens according to claim 1, wherein the zoom lens is a four-unit zoom lens.

8. The zoom lens according to claim 1, wherein the first lens unit comprises a negative lens component having a shape that satisfies the following conditional expression (7):

$$0.3 < (r_{11a} + r_{11b})/(r_{11a} - r_{11b}) < 1.01 \quad (7)$$

where $r_{11a}$ is a paraxial radius of curvature of an object side surface of the negative lens component in the first lens unit, and $r_{11b}$ is a paraxial radius of curvature of an image side surface of the negative lens component in the first lens unit.

9. The zoom lens according to claim 8, wherein the negative lens component in the first lens unit has an object side surface having a curvature that increases in the positive direction with distance from the optical axis.

10. The zoom lens according to claim 1, wherein the third lens unit comprises a negative lens component, and the total number of lens components in the third lens unit is one.

11. The zoom lens according to claim 10, wherein the negative lens component in the third lens unit has a shape that satisfies the following conditional expression (8):

$$-5.0 < (r_{31a} + r_{31b})/(r_{31a} - r_{31b}) < 3.0 \quad (8)$$

where $r_{31a}$ is a paraxial radius of curvature of the object side surface of the negative lens component in the third lens unit, and $r_{31b}$ is a paraxial radius of curvature of an image side surface of the negative lens component in the third lens unit.

12. The zoom lens according to claim 1, wherein each of the first lens unit, the second lens unit, the third lens unit, and the fourth lens unit comprises an aspheric lens.

13. The zoom lens according to claim 1, wherein the zoom lens satisfies the following conditional expression (9):

$$3.5 < f_t/f_w < 10 \quad (9)$$

where $f_t$ is a focal length of the entire zoom lens system at the telephoto end, and $f_w$ is a focal length of the entire zoom lens system at the wide angle end.

14. The zoom lens according to claim 1, wherein the fourth lens unit comprises a positive lens component, and the total number of lens components in the fourth lens unit is one.

15. The zoom lens according to claim 14, wherein the positive lens component in the fourth lens unit has an aspheric object side surface having a curvature that increases in the positive direction with distance from the optical axis, and the positive lens component in the fourth lens unit has a shape that satisfies the following conditional expression (10):

$$-0.7 < (r_{41a} + r_{41b})/(r_{41a} - r_{41b}) < 3.0 \quad (10)$$

where $r_{41a}$ is a paraxial radius of curvature of the object side surface of the positive lens component in the fourth lens unit, and $r_{41b}$ is a paraxial radius of curvature of an image side surface of the positive lens component in the fourth lens unit.

16. The zoom lens according to claim 1, wherein the aperture stop is disposed immediately in front and on the object side of the second lens unit and moves integrally with the second lens unit during zooming from the wide angle end to the telephoto end.

17. The zoom lens according to claim 1, wherein the third lens unit or the fourth lens unit moves during focusing.

18. The zoom lens according to claim 1, wherein the second lens unit and the fourth lens unit satisfy the following conditional expression (13):

$$0.65 < P_4/P_2 < 1.0 \quad (13)$$

where $P_2$ is a refracting power of the second lens unit, and $P_4$ is a refracting power of the fourth lens unit.

19. The zoom lens according to claim 1, wherein the first lens unit and the third lens unit satisfy the following conditional expression (14):

$$0.1 < P_3/P_1 < 0.7 \quad (14),$$

where $P_3$ is a refracting power of the third lens unit, and $P_1$ is a refracting power of the first lens unit.

20. The zoom lens according to claim 1, wherein the zoom lens has anti-reflection coating applied on at least one lens surface among the lens surfaces of the lenses that constitute the zoom lens.

21. An image pickup apparatus comprising:
a zoom lens according to claim 1, and
an image pickup element disposed on the image side of the zoom lens to convert an image formed by the zoom lens into an electrical signal.

22. The image pickup apparatus according to claim 21, wherein
the fourth lens unit comprises a positive lens component, the total number of lens components in the fourth lens unit being one,
an object side surface and an image side surface of the positive lens component are aspheric surfaces each having a curvature that increases in the positive direction with distance from the optical axis, and
the object side surface and the image side surface of the positive lens component have shapes that satisfy the following conditional expression (11):

$$0.5 < \Delta ASP_{41b} / \Delta ASP_{41a} < 10.0 \quad (11)$$

where $\Delta ASP_{41a}$ is an aspheric offset of the object side surface of the positive lens component in the fourth lens unit at a position away from the optical axis by a maximum image height, and $\Delta ASP_{41b}$ is an aspheric offset of the image side surface of the positive lens component in the fourth lens unit at a position away from the optical axis by a maximum image height, wherein the aspheric offset is defined as a distance, along the optical axis, from a reference sphere that has a vertex located at the vertex of an aspheric surface and a radius of curvature equal to the paraxial radius of curvature of the aspheric surface to the aspheric surface, the aspheric offset is represented by a positive value when the aspheric surface is on the image side of the reference sphere, and in the case where the maximum image height changes, the maximum image height refers to the largest possible value thereof.

23. The image pickup apparatus according to claim 21, wherein the zoom lens satisfies the following conditional expression (6):

$$0.5 < enp_{(w)} / IH_{(max)} < 3.0 \quad (6),$$

where $enp_{(w)}$ is the entrance pupil position of the zoom lens at the wide angle end represented by the on-axis distance from the vertex of an object side surface of a lens closest to the object side to the entrance pupil, wherein the entrance pupil position on the image side of the vertex is represented by a positive value, and $IH_{(max)}$ is a maximum image height, wherein in the case where the maximum image height changes, the maximum image height refers to the largest possible value thereof.

24. The zoom lens according to claim 21, wherein the third lens unit moves in such a way as to satisfy the following conditional expression (12):

$$-4.0 < D_{g3} / IH_{(max)} < 0.1 \quad (12),$$

where $D_{g3}$ is a displacement of the position of the third lens unit at the telephoto end from the position at the wide angle end, wherein the displacement toward the image side is represented by a positive value, and $IH_{(max)}$ is a maximum image height, wherein in the case where the maximum image height changes, the maximum image height refers to the largest possible value thereof.

25. The image pickup apparatus according to claim 21, wherein the apparatus comprises an image transformation section that transforms, by image processing, an electrical signal representing an image containing distortion attributed to the zoom lens into an image signal representing an image in which distortion is corrected.

26. The image pickup apparatus according to claim 21, wherein the apparatus comprises an image transformation section that transforms, by image processing, an electrical signal representing an image containing chromatic aberration of magnification attributed to the zoom lens into an image signal representing an image in which chromatic aberration of magnification is corrected.

27. A zoom lens comprising, in order from its object side:
a first lens unit having a negative refracting power;
a second lens unit having a positive refracting power;
a third lens unit having a negative refracting power; and
a fourth lens unit having a positive refracting power, wherein
the zoom lens comprises an aperture stop disposed between the first lens unit and the third lens unit,
during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end,
the first lens unit comprises, in order from the object side, a negative lens component and a positive lens component, the total number of lens components in the first lens unit being two,
the second lens unit and the fourth lens unit satisfy the following conditional expressions (1) and (3), and
the negative lens component in the first lens unit includes a negative lens that satisfies the following conditional expression (4):

$$3.1 < \beta_{2(t)} / \beta_{2(w)} < 6.0 \quad (1)$$

$$1.02 < \beta_{4(t)} / \beta_{4(w)} < 3.00 \quad (3)$$

$$1.80 < nd_{11} < 2.5 \quad (4),$$

where $\beta_{2(w)}$ and $\beta_{2(t)}$ are lateral magnifications of the second lens unit respectively at the wide angle end and at the telephoto end, $\beta_{4(w)}$ and $\beta_{4(t)}$ are lateral magnifications of the fourth lens unit respectively at the wide angle end and at the telephoto end, and $nd_{11}$ is a refractive index, for the d-line, of a certain negative lens in the negative lens component in the first lens unit.

28. A zoom lens comprising, in order from its object side:
a first lens unit having a negative refracting power;
a second lens unit having a positive refracting power;
a third lens unit having a negative refracting power; and
a fourth lens unit having a positive refracting power, wherein
the zoom lens comprises an aperture stop disposed between the first lens unit and the third lens unit,
during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end, the second lens unit and the fourth lens unit satisfy the following conditional expressions (1) and (3), and the first lens unit has a negative lens component having a shape that satisfies the following conditional expression (7):

$$3.1 < \beta_{2(t)}/\beta_{2(w)} < 6.0 \tag{1}$$

$$1.02 < \beta_{4(t)}/\beta_{4(w)} < 3.00 \tag{3}$$

$$0.3 < (r_{11a} + r_{11b})/(r_{11a} - r_{11b}) < 1.01 \tag{7}$$

where $\beta_{2(w)}$ and $\beta_{2(t)}$ are lateral magnifications of the second lens unit respectively at the wide angle end and at the telephoto end, $\beta_{4(w)}$ and $\beta_{4(t)}$ are lateral magnifications of the fourth lens unit respectively at the wide angle end and at the telephoto end, $r_{11a}$ is a paraxial radius of curvature of an object side surface of the negative lens component in the first lens unit, and $r_{11b}$ is a paraxial radius of curvature of an image side surface of the negative lens component in the first lens unit.

29. A zoom lens comprising, in order from its object side:
a first lens unit having a negative refracting power;
a second lens unit having a positive refracting power;
a third lens unit having a negative refracting power; and
a fourth lens unit having a positive refracting power, wherein
the zoom lens comprises an aperture stop disposed between the first lens unit and the third lens unit,
during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end,
the first lens unit comprises a negative lens component having an object side surface having a curvature that increases in the positive direction with distance from the optical axis, and
the second lens unit and the fourth lens unit satisfy the following conditional expressions (1) and (3):

$$3.1 < \beta_{2(t)}/\beta_{2(w)} < 6.0 \tag{1}$$

$$1.02 < \beta_{4(t)}/\beta_{4(w)} < 3.00 \tag{3}$$

where $\beta_{2(w)}$ and $\beta_{2(t)}$ are lateral magnifications of the second lens unit respectively at the wide angle end and at the telephoto end, $\beta_{4(w)}$ and $\beta_{4(t)}$ are lateral magnifications of the fourth lens unit respectively at the wide angle end and at the telephoto end.

30. A zoom lens comprising, in order from its object side:
a first lens unit having a negative refracting power;
a second lens unit having a positive refracting power;
a third lens unit having a negative refracting power; and
a fourth lens unit having a positive refracting power, wherein
the zoom lens comprises an aperture stop disposed between the first lens unit and the third lens unit,
during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end,
the aperture stop moves integrally with the second lens unit during zooming from the telephoto end to the wide angle end, and
the second lens unit and the fourth lens unit satisfy the following conditional expressions (1) and (3):

$$3.1 < \beta_{2(t)}/\beta_{2(w)} < 6.0 \tag{1}$$

$$1.02 < \beta_{4(t)}/\beta_{4(w)} < 3.00 \tag{3}$$

where $\beta_{2(w)}$ and $\beta_{2(t)}$ are lateral magnifications of the second lens unit respectively at the wide angle end and at the telephoto end, $\beta_{4(w)}$ and $\beta_{4(t)}$ are lateral magnifications of the fourth lens unit respectively at the wide angle end and at the telephoto end.

31. A zoom lens comprising, in order from its object side:
a first lens unit having a negative refracting power;
a second lens unit having a positive refracting power;
a third lens unit having a negative refracting power; and
a fourth lens unit having a positive refracting power, wherein
the zoom lens comprises an aperture stop disposed between the first lens unit and the third lens unit,
during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end,
the third lens unit comprises a negative single lens element, the total number of lens elements in the third lens unit being one, and
the second lens unit and the fourth lens unit satisfy the following conditional expressions (1) and (3):

$$3.1 < \beta_{2(t)}/\beta_{2(w)} < 6.0 \tag{1}$$

$$1.02 < \beta_{4(t)}/\beta_{4(w)} < 3.00 \tag{3}$$

where $\beta_{2(w)}$ and $\beta_{2(t)}$ are lateral magnifications of the second lens unit respectively at the wide angle end and at the telephoto end, $\beta_{4(w)}$ and $\beta_{4(t)}$ are lateral magnifications of the fourth lens unit respectively at the wide angle end and at the telephoto end.

32. A zoom lens comprising, in order from its object side:
a first lens unit having a negative refracting power;
a second lens unit having a positive refracting power;
a third lens unit having a negative refracting power; and a fourth lens unit having a positive refracting power,
wherein the zoom lens comprises an aperture stop disposed between the first lens unit and the third lens unit, during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end, the second lens unit comprises a cemented lens component comprising, in order from the object side, a positive lens and a negative lens, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are lateral magnifications of the second lens unit respectively at the wide angle end and at the telephoto end, $\beta_{4(w)}$ and $\beta_{4(t)}$ are lateral magnifications of the fourth lens unit respectively at the wide angle end and at the telephoto end.

33. The zoom lens according to claim 32, wherein each of the positive lens and the negative lens in the cemented lens component is a meniscus lens having a convex surface directed toward the object side.

34. The zoom lens according to claim 32, wherein the positive lens in the cemented lens component is a biconvex positive lens, and the negative lens in the cemented lens component is a biconcave negative lens.

35. A zoom lens comprising, in order from its object side:
a first lens unit having a negative refracting power;
a second lens unit having a positive refracting power;
a third lens unit having a negative refracting power; and
a fourth lens unit having a positive refracting power,
wherein the zoom lens comprises an aperture stop disposed between the first lens unit and the third lens unit, during zooming from the wide angle end to the telephoto end, distances between the lens units change, the first lens unit moves first toward the image side and thereafter toward the object side, the second lens unit moves in such a way as to be located closer to the object side at the telephoto end than at the wide angle end, the fourth lens unit moves in such a way as to be located closer to the image side at the telephoto end than at the wide angle end, a distance between the second lens unit and the third lens unit is larger at the telephoto end than at the wide angle end, and the aperture stop moves in such a way as to be located closer to the object side at the telephoto end than at the wide angle end, the aperture stop is disposed immediately in front and on the object side of the second lens unit, the zoom lens comprises a flare stop disposed between the second lens unit and the third lens unit, and the second lens unit and the fourth lens unit satisfy the following conditional expressions (1) and (3):

$$3.1 < \beta_{2(t)}/\beta_{2(w)} < 6.0 \quad (1)$$

$$1.02 < \beta_{4(t)}/\beta_{4(w)} < 3.00 \quad (3)$$

where $\beta_{2(w)}$ and $\beta_{2(t)}$ are lateral magnifications of the second lens unit respectively at the wide angle end and at the telephoto end, $\beta_{4(w)}$ and $\beta_{4(t)}$ are lateral magnifications of the fourth lens unit respectively at the wide angle end and at the telephoto end.

* * * * *